United States Patent
Cheng et al.

(10) Patent No.: US 8,994,218 B2
(45) Date of Patent: Mar. 31, 2015

(54) SMART AND SCALABLE OFF-GRID MINI-INVERTERS

(75) Inventors: George Shu-Xing Cheng, Folsom, CA (US); Steven L. Mulkey, Cameron Park, CA (US); Andrew J. Chow, Sacramento, CA (US)

(73) Assignee: CyboEnergy, Inc., Rancho Cordova, CA (US)

( * ) Notice: Subject to any disclaimer, the term of this patent is extended or adjusted under 35 U.S.C. 154(b) by 534 days.

(21) Appl. No.: 13/493,622

(22) Filed: Jun. 11, 2012

(65) Prior Publication Data

US 2012/0313443 A1     Dec. 13, 2012

Related U.S. Application Data

(60) Provisional application No. 61/495,540, filed on Jun. 10, 2011.

(51) Int. Cl.
| | | |
|---|---|---|
| H02J 3/38 | (2006.01) | |
| H02M 7/48 | (2006.01) | |
| H02J 3/46 | (2006.01) | |
| H02J 1/00 | (2006.01) | |
| H02M 1/00 | (2006.01) | |

(52) U.S. Cl.
CPC .................. *H02J 3/383* (2013.01); *H02M 7/48* (2013.01); *H02M 2001/007* (2013.01); *Y02B 10/14* (2013.01); *Y02E 10/563* (2013.01); *H02J 3/46* (2013.01)
USPC .......................................................... 307/82

(58) Field of Classification Search
USPC .......................................................... 307/82
IPC ............................................................ H02J 1/00
See application file for complete search history.

(56) References Cited

U.S. PATENT DOCUMENTS

| | | | |
|---|---|---|---|
| 5,903,116 | A | 5/1999 | Geis |
| 6,031,294 | A | 2/2000 | Geis |
| 6,055,524 | A | 4/2000 | Cheng |
| 6,192,668 | B1 | 2/2001 | Mackay |
| 6,265,786 | B1 | 7/2001 | Bosley |
| 6,325,142 | B1 | 12/2001 | Bosley |
| 6,360,131 | B1 | 3/2002 | Cheng |
| 6,381,944 | B2 | 5/2002 | Mackay |

(Continued)

FOREIGN PATENT DOCUMENTS

JP                09275637          10/1997

OTHER PUBLICATIONS

Rashid H. Muhammad, Power Electronics Handbook, 2007, Academic Press.

(Continued)

*Primary Examiner* — Robert Deberadinis
(74) *Attorney, Agent, or Firm* — DLA Piper LLP (US)

(57) ABSTRACT

A method and apparatus is disclosed for intelligently inverting DC power from DC sources such as photovoltaic (PV) solar modules to single-phase or three-phase AC power to supply power for off-grid applications. A number of regular or redundant off-grid Mini-Inverters with one, two, three, or multiple input channels in a mixed variety can easily connect to one, two, three, or multiple DC power sources such as solar PV modules, invert the DC power to AC power, and daisy chain together to generate and supply AC power to electrical devices that are not connected to the power grid including motors, pumps, fans, lights, appliances, and homes.

22 Claims, 15 Drawing Sheets

(56) References Cited

U.S. PATENT DOCUMENTS

| | | |
|---|---|---|
| 6,487,096 B1 | 11/2002 | Gilbreth |
| 6,495,929 B2 | 12/2002 | Bosley |
| 6,556,980 B1 | 4/2003 | Cheng |
| 6,612,112 B2 | 9/2003 | Gilbreth |
| 6,684,112 B1 | 1/2004 | Cheng |
| 6,684,115 B1 | 1/2004 | Cheng |
| 6,784,565 B2 | 8/2004 | Wall |
| 6,870,279 B2 | 3/2005 | Gilbreth |
| 6,958,550 B2 | 10/2005 | Gilbreth |
| 6,960,840 B2 | 11/2005 | Willis |
| 7,016,743 B1 | 3/2006 | Cheng |
| 7,142,626 B2 | 11/2006 | Cheng |
| 7,152,052 B2 | 12/2006 | Cheng |
| 7,415,446 B2 | 8/2008 | Cheng |
| 2001/0052704 A1 | 12/2001 | Bosley |
| 2002/0073713 A1 | 6/2002 | Mackay |
| 2002/0099476 A1 | 7/2002 | Hamrin |
| 2002/0166324 A1 | 11/2002 | Willis |
| 2003/0007369 A1 | 1/2003 | Gilbreth |
| 2003/0111103 A1 | 6/2003 | Bower |
| 2004/0103669 A1 | 6/2004 | Willis |
| 2004/0119291 A1 | 6/2004 | Hamrin |
| 2004/0135436 A1 | 7/2004 | Gilbreth |
| 2004/0264225 A1 | 12/2004 | Bhavaraju |
| 2008/0050349 A1 | 2/2008 | Stewart |
| 2008/0111517 A1 | 5/2008 | Pfeifer |
| 2008/0283118 A1 | 11/2008 | Rotzoll |
| 2009/0000654 A1 | 1/2009 | Rotzoll |
| 2009/0159113 A1 | 6/2009 | Morimoto |
| 2009/0160258 A1 | 6/2009 | James |
| 2010/0202177 A1 | 8/2010 | Kajouke |
| 2010/0237703 A1 | 9/2010 | Stern |
| 2011/0012430 A1 | 1/2011 | Cheng |
| 2011/0273022 A1 | 11/2011 | Dennis |
| 2012/0025618 A1 | 2/2012 | Erickson |

OTHER PUBLICATIONS

Maniktala, Sanjaya., "Switching Power Supplies A to Z," Elsevier, 2006.
International Search Report issued in PCT/US2010/042123 mailed Feb. 22, 2011.
Written Opinion issued in PCT/US2010/042123 Report mailed Feb. 22, 2011.
R. Jones. "The Measurement of Lumped Parameter Impedance: A Metrology Guide," University of Michigan, Jan. 1974.
International Preliminary Report on Patentability issued in PCT/US2010/042123 on Jan. 26, 2012.
Related U.S. Appl. No. 12/837,162 electronically captured on Nov. 6, 2013.
Related U.S. Appl. No. 13/397,402 electronically captured on Nov. 6, 2013.
Related U.S. Appl. No. 13/537,206 electronically captured on Nov. 6, 2013.
International Search Report and Written Opinion issued in PCT/US2012/041923 on Jan. 17, 2013.
Related U.S. Appl. No. 12/837,162 electronically captured on Feb. 27, 2014.
Related U.S. Appl. No. 12/837,162.
Related U.S. Appl. No. 13/844,484.

SMART AND SCALABLE OFF-GRID MINI-INVERTERS

INVENTION

This application claims priority to U.S. Provisional Application No. 61/495,540 filed on Jun. 10, 2011, which is herein incorporated by reference.

The subject of this patent relates to direct current (DC) to alternating current (AC) power inverters that invert DC power from single or multiple DC power sources to single-phase or three-phase AC power; where the DC power sources include but are not limited to photovoltaic (PV) solar modules, fuel cells, batteries, and other DC power generators. More particularly, this patent relates to a method and apparatus that can intelligently invert DC power generated by single or multiple solar modules to single-phase or three-phase AC power to supply power to electrical devices including but not limited to motors, pumps, fans, lights, appliances, and homes that are not connected to the electrical power grid.

In the U.S. patent application Ser. No. 12/837,162, the entirety of which is hereby incorporated by reference, we described the novel smart and scalable power inverters and the unique scalable design so that the DC to AC power inversion system can include as few as one inverter and one DC source, up to a selected number of inverters and multiple DC sources. A number of smart single-input, dual-input, triple-input, quad-input, and multiple-input power inverters in a mixed variety can easily connect to single, dual, triple, quad, and multiple DC power sources, invert the DC power to AC power, and daisy chain together to generate a total power, which is equal to the summation of the AC power supplied by each smart and scalable power inverter.

In the U.S. patent application No. 61/442,991, the entirety of which is hereby incorporated by reference, we described the scalable and redundant Mini-Inverters that have double, triple, or quadruple redundant capabilities so that the Mini-Inverters can work in a harsh environment for a prolonged period of time. A number of regular, redundant, triple redundant, or quadruple redundant Mini-Inverters with one, two, three, or multiple input channels in a mixed variety can easily connect to one, two, three, or multiple DC power sources such as solar PV modules, invert the DC power to AC power, and daisy chain together to generate AC power to feed the power grid.

In this patent, we expand the invention by introducing the Smart and Scalable Off-Grid Mini-Inverters that not only have the key scalable and redundant features as described in U.S. patent applications Ser. No. 12/837,162 and No. 61/442,991, but can also supply power to electrical devices that are not connected to the power grid including motors, pumps, fans, lights, appliances, and homes. What is more, we are introducing a novel concept: Grid Flexibility. That is, the same family of the smart and scalable power inverters can be designed to include both Grid-tie and Off-grid Mini-Inverters.

In the accompanying drawing:

FIG. 1 is a block diagram illustrating a smart and scalable off-grid power inversion system where one 2-channel off-grid AC Master Mini-Inverter inverts the DC power from 2 DC sources to single-phase AC power to supply electricity to the AC load.

FIG. 2 is a block diagram illustrating a smart and scalable off-grid power inversion system where one 2-channel AC Master Mini-Inverter and one or more 2-channel off-grid Mini-Inverters daisy chain, each of which inverts the DC power from 2 DC sources to single-phase AC power to supply electricity to the AC load.

FIG. 3 is a block diagram illustrating a smart and scalable off-grid power inversion system where one 2-channel AC Master redundant Mini-Inverter and one or more 2-channel off-grid redundant Mini-Inverters daisy chain, each of which inverts the DC power from 2 DC sources to three-phase AC power to supply electricity to the AC load.

FIG. 4 is a block diagram illustrating a smart and scalable off-grid power inversion system where one 1-channel AC Master Mini-Inverter and one or more 1-channel off-grid Mini-Inverters daisy chain, each of which inverts the DC power from one DC source to single-phase AC power to supply electricity to the AC load.

FIG. 5 is a block diagram illustrating a smart and scalable off-grid solar power system where one 4-channel AC Master Mini-Inverter and one or more 4-channel off-grid Mini-Inverters daisy chain, each of which inverts the DC power from 4 solar panels to single-phase AC power to supply electricity to the AC load.

FIG. 6 is a block diagram illustrating a smart and scalable off-grid solar power system where one 6-channel AC Master Mini-Inverter and one or more 6-channel off-grid Mini-Inverters daisy chain, each of which inverts the DC power from 6 solar panels to three-phase AC power to supply electricity to the AC load.

FIG. 7 is a block diagram illustrating a smart and scalable off-grid redundant solar power system where one 6-channel AC Master redundant Mini-Inverter and one or more 6-channel off-grid redundant Mini-Inverters daisy chain, each of which inverts the DC power from 6 solar panels to three-phase AC power to supply electricity to the AC load.

FIG. 8 is a block diagram illustrating a smart and scalable off-grid solar power system where one 4-channel off-grid redundant Mini-Inverter, one 6-channel AC Master Mini-Inverter, one 8-channel off-grid Mini-Inverter, and a number of off-grid Mini-Inverters in a mixed variety daisy chain to generate single-phase AC power to supply electricity to the AC load.

FIG. 9 is a block diagram illustrating a smart and scalable off-grid solar power system where one 1-channel AC Master triple redundant Mini-Inverter, one 5-channel off-grid Mini-Inverter, one 8-channel off-grid Mini-Inverter, and a number of Mini-Inverters in a mixed variety daisy chain to generate three-phase AC power to supply electricity to the AC load.

The term "mechanism" is used herein to represent hardware, software, or any combination thereof. The term "solar module" or "solar panel" refers to photovoltaic (PV) solar modules. The term "AC load" is used herein to represent one or more single-phase or three-phase electrical devices including but not limited to motors, pumps, fans, lights, appliances, and homes. The term "AC Master" is used herein to represent a special off-grid Mini-Inverter in a solar power generation system to generate AC power for off-grid applications. An AC Master has the responsibility to be the "leading inverter" to generate AC power to an off-grid powerline to allow the other off-grid Mini-Inverters also connected to the same AC powerline to synchronize the AC power being produced.

Throughout this document, m=1, 2, 3, . . . , as an integer, which is used to indicate the number of the DC input ports of a Mini-Inverter. The term "input channel" refers to the DC input port of the Mini-Inverter. Then, an m-channel Mini-Inverter means that the Mini-Inverter has m input channels or m DC input ports.

Throughout this document, n=1, 2, 3, . . . , as an integer, which is used to indicate the number of Mini-Inverters that daisy chain in the same power inversion system.

Throughout this document, if a power inversion system or a power inverter is used to generate single-phase AC, it can also be applied to three-phase AC without departing from the spirit or scope of our invention. If a power inversion system or a power inverter is used to generate three-phase AC, it can also be applied to single-phase AC without departing from the spirit or scope of our invention.

Without losing generality, all numerical values given in this patent are examples. Other values can be used without departing from the spirit or scope of our invention.

DESCRIPTION

Figure 1:
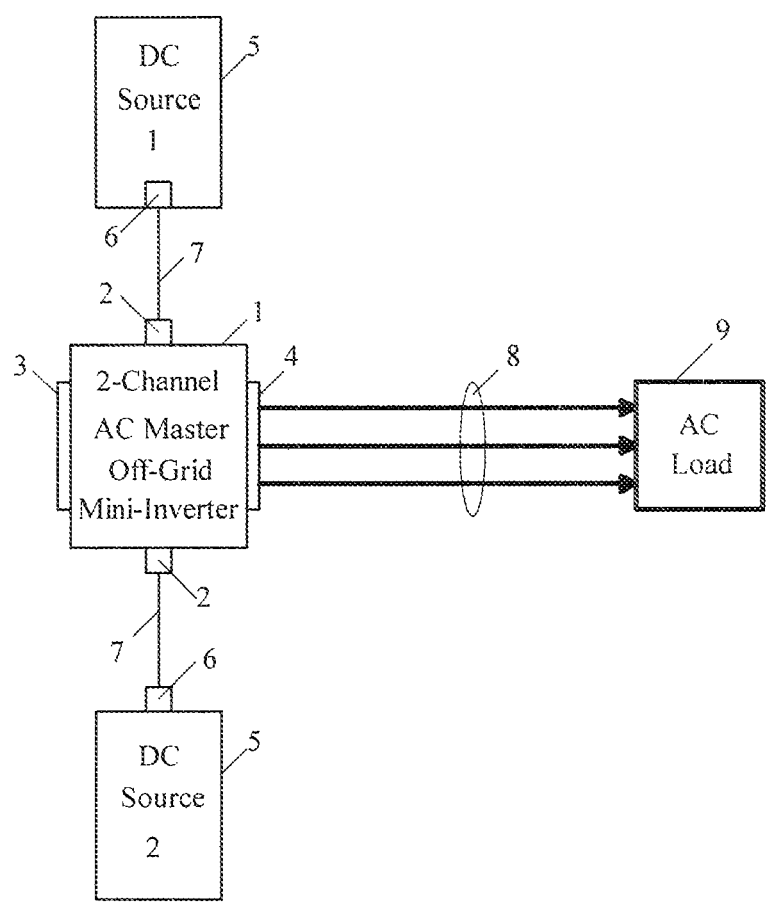

FIG. 1 is a block diagram illustrating a smart and scalable off-grid power inversion system where one 2-channel off-grid AC Master Mini-Inverter inverts the DC power from 2 DC sources to single-phase AC power to supply electricity to the AC load. The off-grid AC Master Mini-Inverter 1 comprises an AC power input port 3, an AC power output port 4, and two DC input channels 2. Each DC power source 5 such as a solar module comprises a DC power connector 6 connecting to a DC input channel 2 of the Mini-Inverter via a DC power cable 7. The Mini-Inverter's AC output port 4 is connected to the AC load 9 via the single-phase AC powerline 8.

In a scalable off-grid power inversion system where one or multiple scalable off-grid Mini-Inverters are connected through AC cables, there must exist one and only one AC Master Mini-Inverter according to this invention. If someone connects two or more AC Masters together in the same system, all the AC Masters other than the first one will simply not turn on and will send an error signal.

On the other hand, if there is only one Mini-Inverter in a scalable off-grid power inversion system, the inverter has to be an AC Master Mini-Inverter. The AC Master performs the following functions: (1) Checks the impedance of the AC powerline to determine if the connected AC load is within certain specifications; (2) Initially energizes the AC powerline that has no power running to it; (3) Continually delivers AC power to the AC powerline to allow the other off-grid Mini-Inverters also connected on the same powerline to synchronize the AC power being produced; and (4) Continually checks and determines whether the AC load is too large or too small for the power generation system to handle. If it is too large or too small, turns the power off and triggers an error signal. When this happens, all other daisy chained off-grid Mini-Inverters will turn off automatically and immediately.

Figure 2:
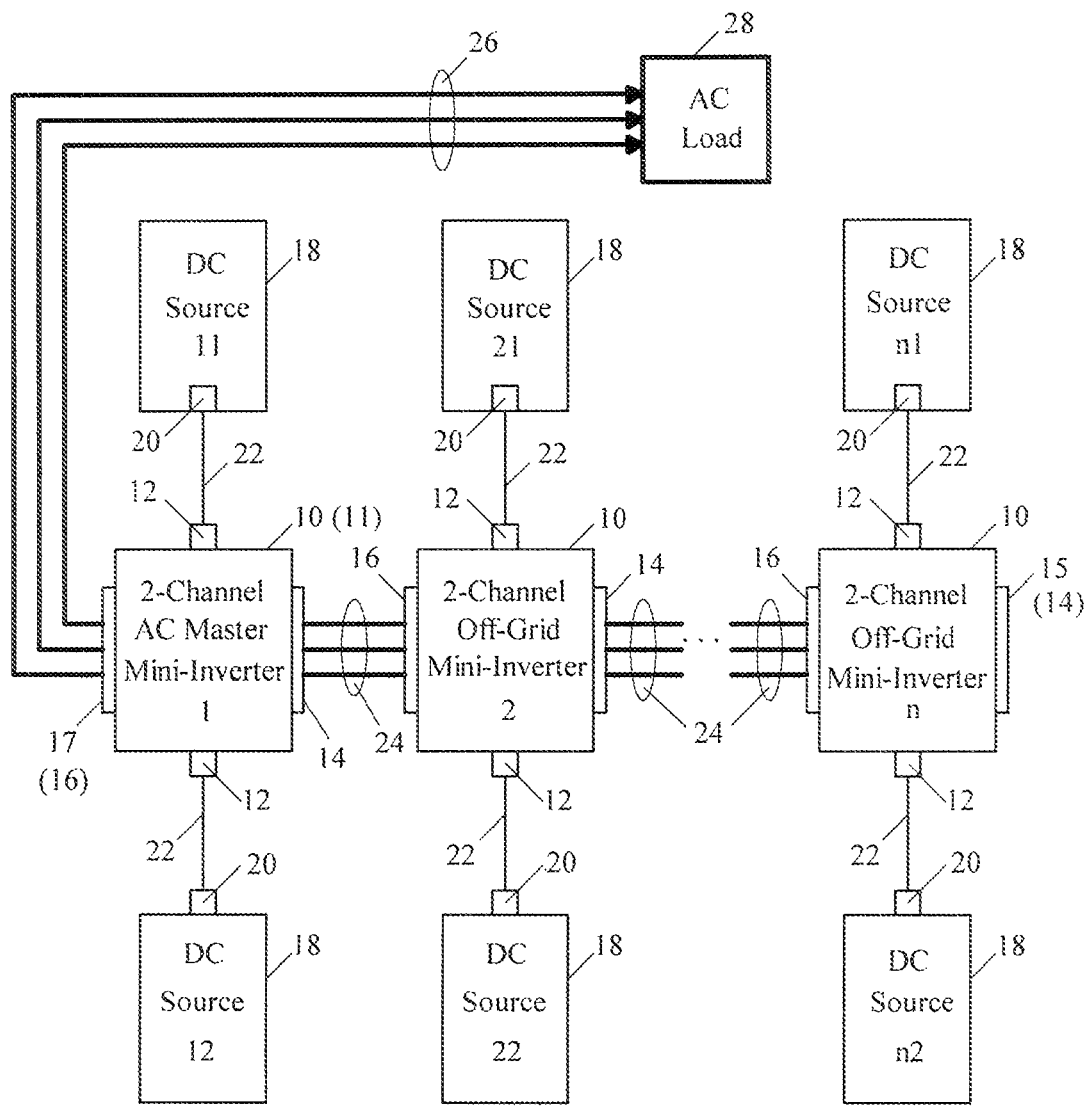

FIG. 2 is a block diagram illustrating a smart and scalable off-grid power inversion system where one 2-channel AC Master Mini-Inverter and one or more 2-channel off-grid Master Mini-Inverters daisy chain, each of which inverts the DC power from 2 DC sources to single-phase AC power to supply electricity to the AC load. The system comprises n 2-channel off-grid Mini-Inverters 10 and two times more of the DC power sources 18, so the total number of DC power sources is 2×n (2 times n). One and only one of the n 2-channel off-grid Mini-Inverters is an AC. Master. In FIG. 2, the AC Master 11 is located on the left and is labeled Mini-Inverter 1.

Each off-grid Mini-Inverter 10, including the AC Master Mini-Inverter 11, comprises an AC power input port 14, an AC power output port 16, and two DC input channels 12. Each DC power source such as a solar module comprises a DC power connector 20 connecting to a DC input channel 12 of its corresponding Mini-Inverter via a DC power cable 22. All Mini-Inverters 10 daisy chain, where the first Mini-Inverter's AC input port 15 is left open, and the last Mini-Inverter's AC output port 17 is connected to the AC load 28 via the single-phase AC powerline 26.

Throughout this document, n=1, 2, 3, . . . , as an integer, which is used to indicate the number of Mini-Inverters that daisy chain in the same power inversion system. Based on the number of input channels of all the Mini-Inverters in the same power inversion system, there could be a limit to the actual number of Mini-Inverters that can daisy chain. This is because the total generated AC power cannot exceed the limit of the connected AC load within a specification. Otherwise, the "Open Load" situation will occur causing the Mini-Inverters to shut down based on their open-load protection mechanism.

Without losing generality, let us say n=5 as an example. That means, five 2-channel scalable off-grid Mini-Inverters can daisy chain, where the AC output port of a Mini-Inverter connects to the AC input port of the next Mini-Inverter, and so on. The first Mini-Inverter's AC input port is left open, and the last Mini-Inverter's AC output port is connected to the AC load to supply electricity to the load. This method greatly simplifies the wiring job when installing a PV solar power system.

Although we say the Mini-Inverters daisy chain, where the AC output port of each Mini-Inverter is connected to the AC input port of the next Mini-Inverter, the actual connection of the inverters is pass-through. That means, the generated AC power from each Mini-Inverter is added in parallel onto the AC powerline. In this scheme, a defective or low-producing Mini-Inverter will not interfere with other Mini-Inverters that are able to generate usable AC power. Unless the AC powerline is broken, all the healthy Mini-Inverters on the AC powerline will continue to work. For the same reason, the actual location of the AC Master connected on the AC powerline is not important. It can be located at any position in the daisy chain.

Figure 3:
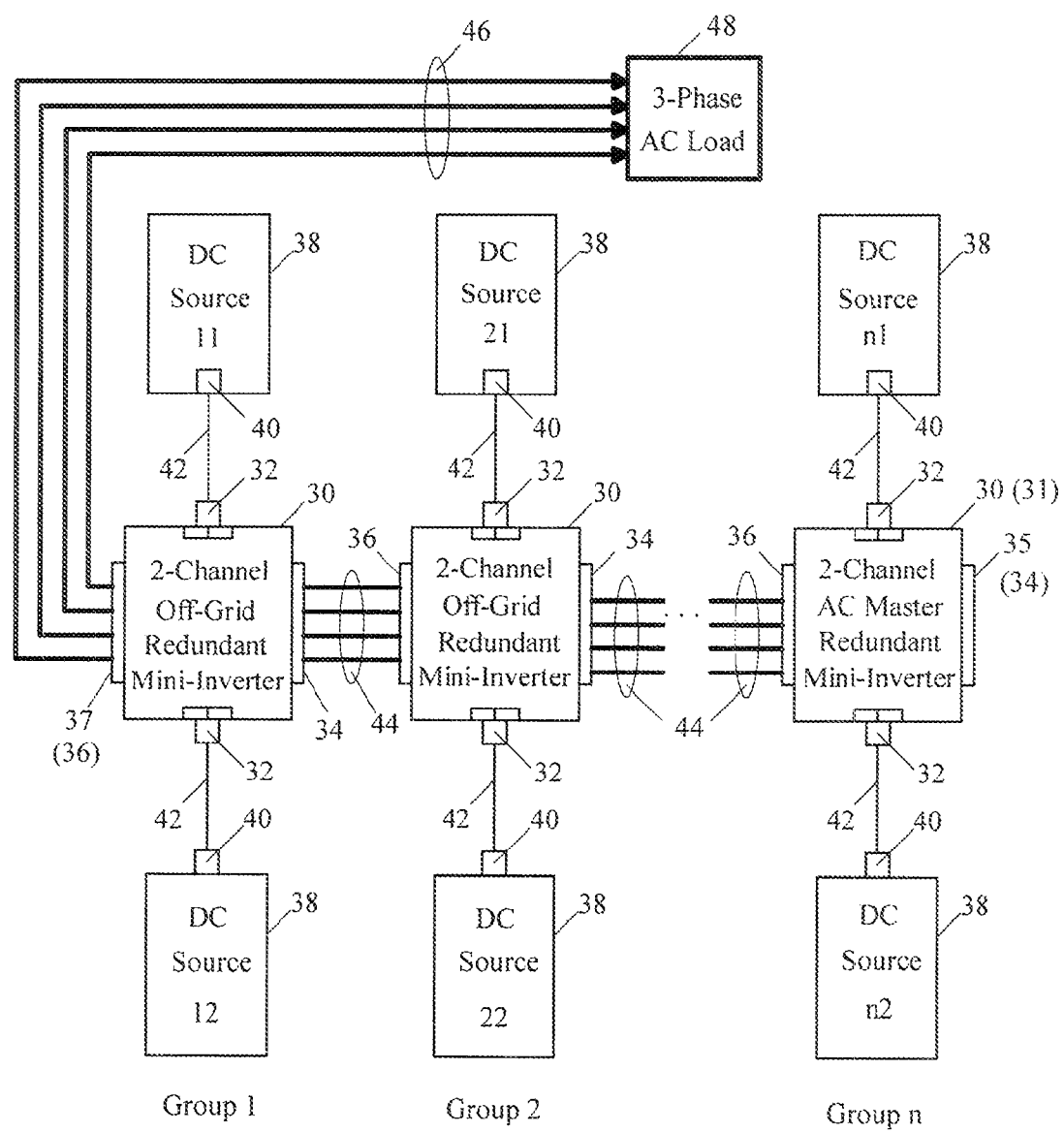

FIG. 3 is a block diagram illustrating a smart and scalable off-grid power inversion system where one 2-channel AC Master redundant Mini-Inverter and one or more 2-channel off-grid redundant Mini-Inverters daisy chain, each of which inverts the DC power from 2 DC sources to three-phase AC power to supply electricity to the AC load. The system comprises n 2-channel redundant Mini-Inverters 30 and two times more of the DC power sources 38, so the total number of DC power sources is 2×n (2 times n). Each off-grid Mini-Inverter, including the AC Master redundant Mini-Inverter 31, comprises an AC power input port 34, an AC power output port 36, and two redundant DC input channels 32. Each DC power source such as a solar module comprises a DC power connector 40 connecting to a redundant DC input channel 32 of its corresponding Mini-Inverter via a DC power cable 42. All Mini-Inverters 30 daisy chain, where the first Mini-Inverter's AC input port 35 is left open, and the last Mini-Inverter's AC output port 37 is connected to a three-phase AC load 48 via the three-phase AC powerline 46.

Figure 4:
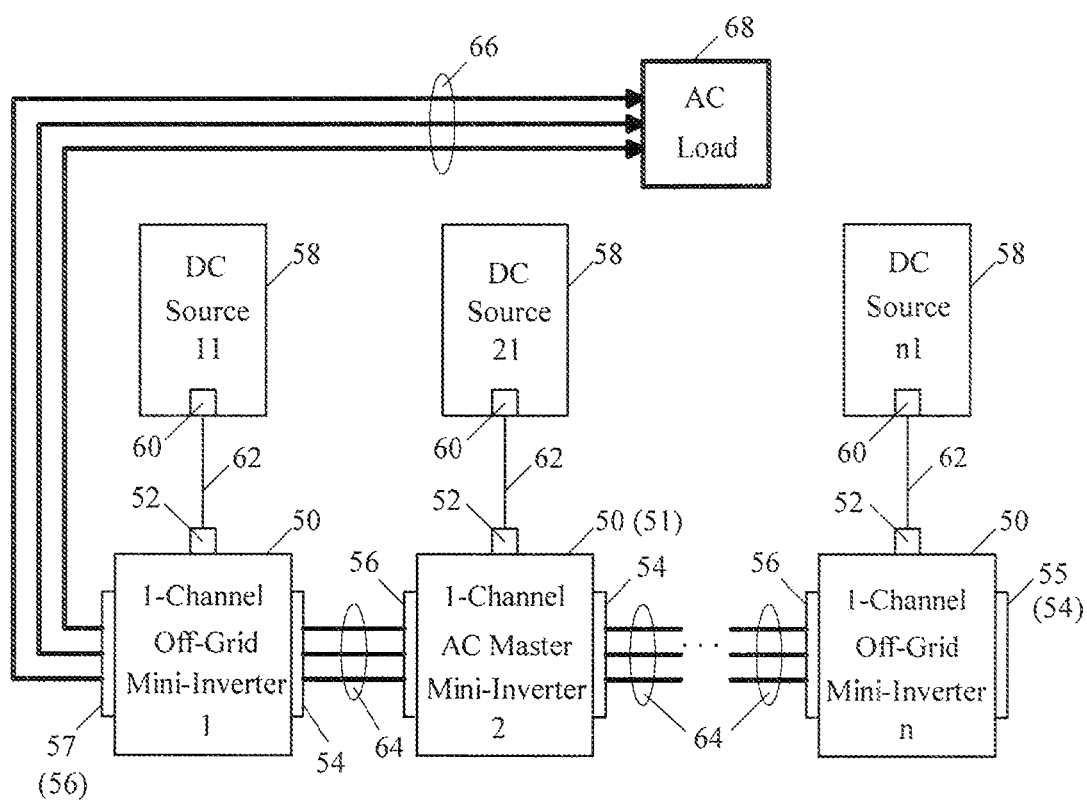

FIG. 4 is a block diagram illustrating a smart and scalable off-grid power inversion system where one I-channel AC Master Mini-Inverter and one or more 1-channel off-grid Mini-Inverters daisy chain, each of which inverts the DC power from one DC source to single-phase AC power to supply electricity to the AC load. The system comprises n 1-channel Mini-Inverters 50 and the same number of DC power sources or solar panels 58. Each Mini-Inverter, including the AC Master Mini-Inverter 51, comprises an AC power input port 54, an AC power output port 56, and one DC input channel 52. Each DC power source such as a solar panel comprises a DC power connector 60 connecting to a DC input channel 52 of its corresponding Mini-Inverter via a DC power cable 62. All Mini-Inverters 50 daisy chain, where the first Mini-Inverter's AC input port 55 is left open, and the last Mini-Inverter's AC output port 57 is connected to the AC load 68 via the single-phase AC powerline 66.

Please note that a single channel or 1-channel off-grid Mini-Inverter may look like a solar power Microinverter. However, the off-grid design of the Mini-Inverter as well as the AC Master Mini-Inverter are novel. The details will be described in FIGS. 10 to 15.

In FIGS. 5 to 9, we will use solar panels as DC sources as an example. This does not exclude other forms of DC sources such as fuel cells, batteries, etc.

Figure 5:
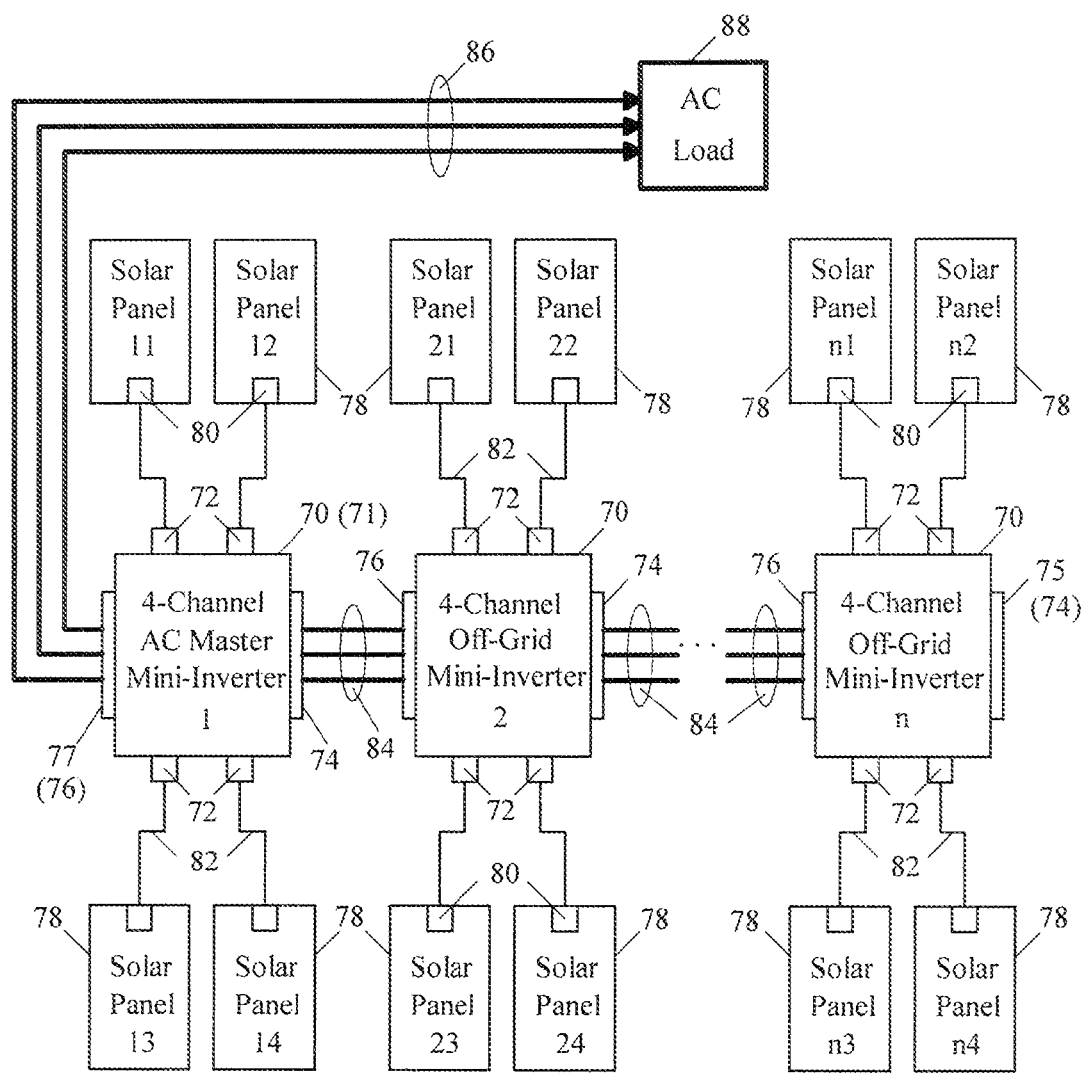

FIG. 5 is a block diagram illustrating a smart and scalable off-grid solar power system where one 4-channel AC Master Mini-Inverter and one or more 4-channel off-grid Mini-Inverters daisy chain, each of which inverts the DC power from 4 solar panels to single-phase AC power to supply electricity to the AC load. The system comprises n 4-channel Mini-Inverters 70 and four times more of the DC power sources or solar panels 78, so the total number of DC power sources or solar panels is 4×n (4 times n). Each Mini-Inverter, including the AC Master Mini-Inverter 71, comprises an AC power input port 74, an AC power output port 76, and four DC input channels 72. Each DC power source such as a solar panel comprises a DC power connector 80 connecting to a DC input channel 72 of its corresponding Mini-Inverter via a DC power cable 82. All Mini-Inverters 70 daisy chain, where the first Mini-Inverter's AC input port 75 is left open, and the last Mini-Inverter's AC output port 77 is connected to the AC load 88 via the single-phase AC powerline 86.

Figure 6:
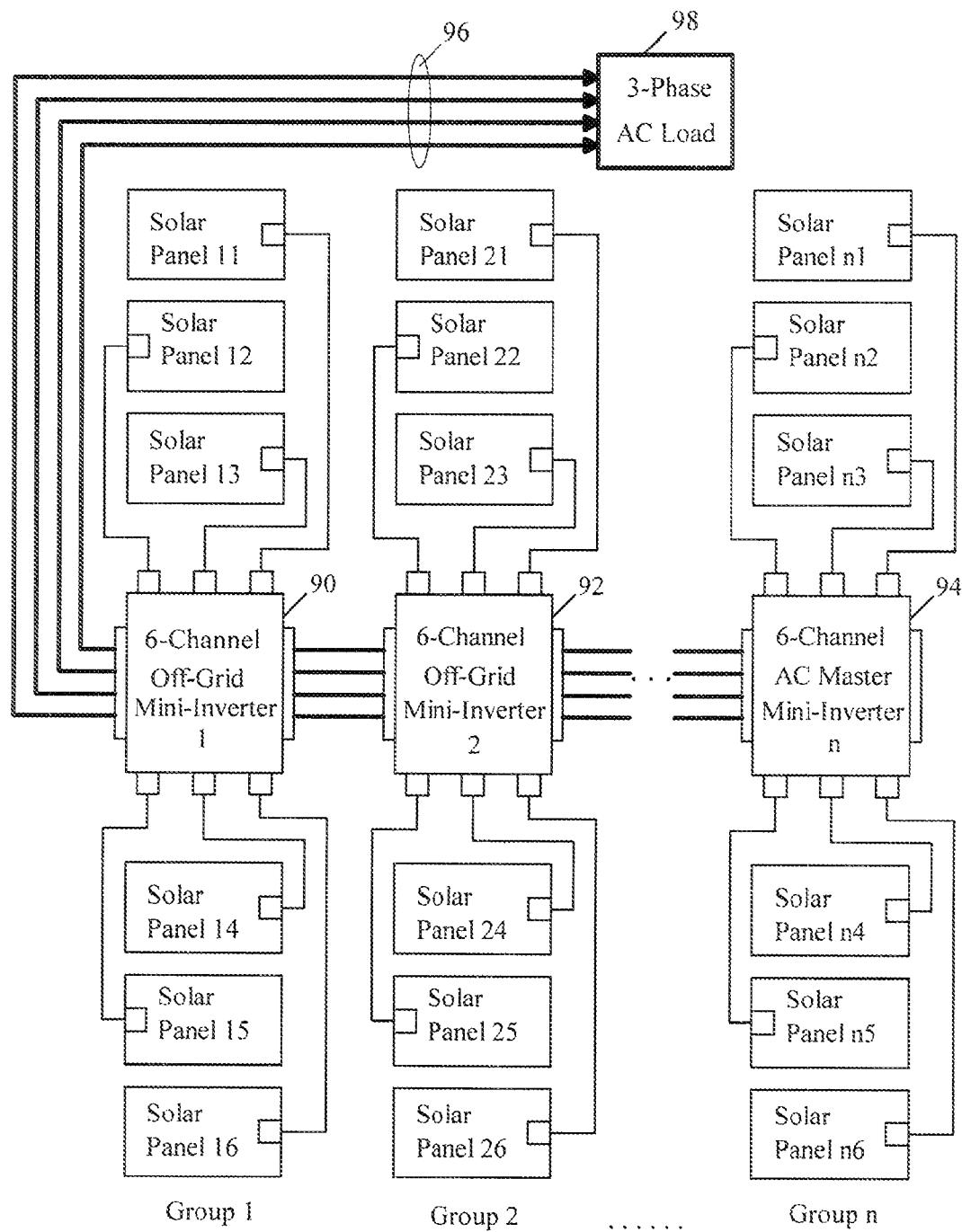

FIG. 6 is a block diagram illustrating a smart and scalable off-grid solar power system where one 6-channel AC Master Mini-Inverter and one or more 6-channel off-grid Mini-Inverters daisy chain, each of which inverts the DC power from 6 solar panels to three-phase AC power to supply electricity to the AC load. The system comprises n 6-channel Mini-Inverters 90, 92, . . . , 94 and six times more of the DC power sources or solar panels, so the total number of DC power sources or solar panels is 6×n (6 times n). Each Mini-Inverter comprises an AC power input port, an AC power output port, and six DC input channels. Each solar panel is connected to a DC input channel of its corresponding Mini-Inverter.

With a systematic approach, we will form each Mini-Inverter and its connected solar panels into groups. In Group 1, the 6-channel off-grid Mini-Inverter 90 is connected to Solar Panels 11, 12, 13, 14, 15, and 16. In Group 2, the 6-channel off-grid Mini-Inverter 92 is connected to Solar Panels 21, 22, 23, 24, 25, and 26. In Group n, the 6-channel AC Master Mini-Inverter 94 is connected to Solar Panels n1, n2, n3, n4, n5, and n6. There could be more groups in between Group 2 and Group n. The actual number will be based on the size of the solar power system as well as the number of the Mini-Inverters that can daisy chain without violating the power limit of the AC load 98. All Mini-Inverters from Group 1 to Group n daisy chain, where the AC input port of the first Mini-Inverter 94 is left open, and the AC output port of the last Mini-Inverter 90 is connected to the AC load 98 via the three-phase AC powerline 96.

Figure 7:
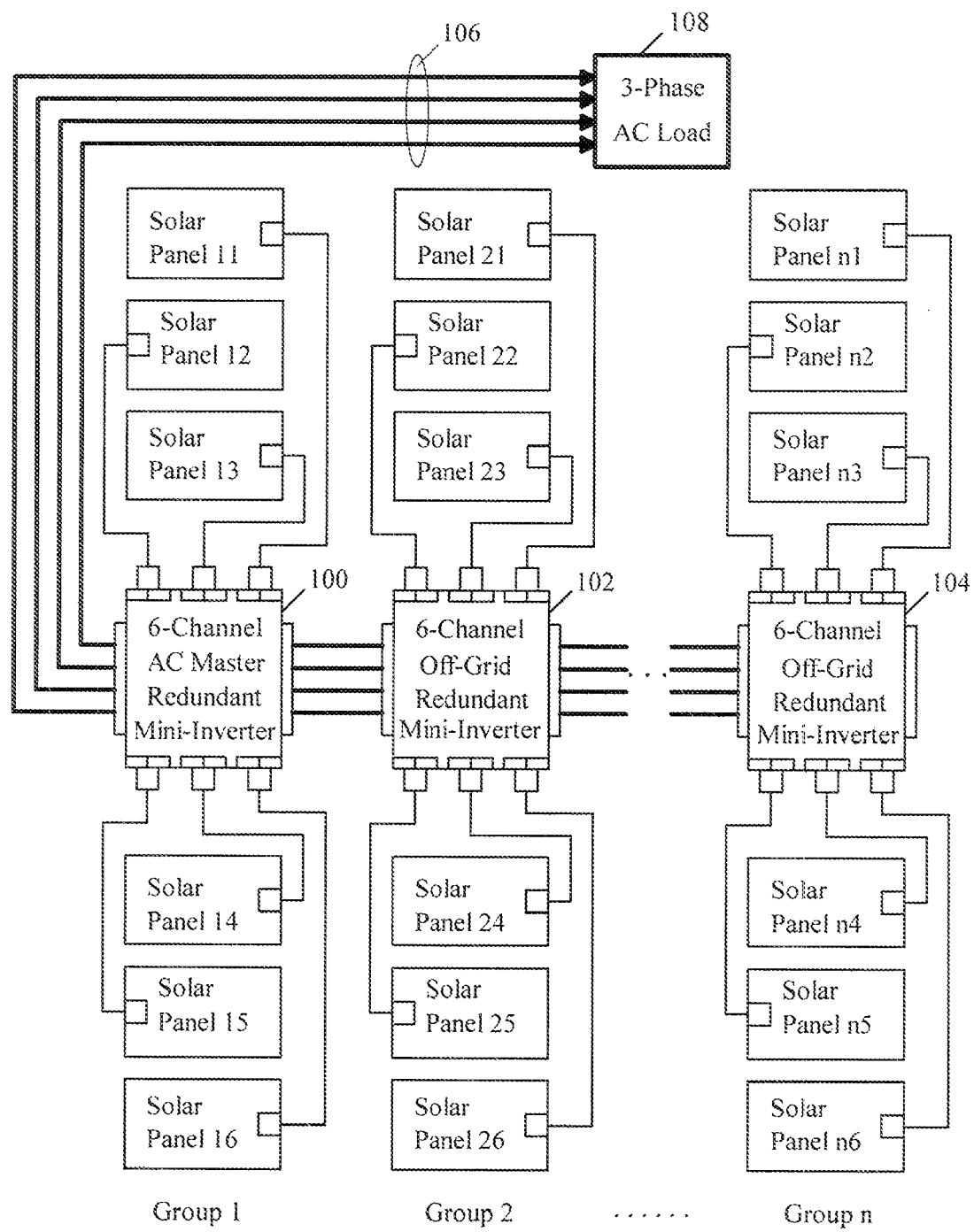

FIG. 7 is a block diagram illustrating a smart and scalable off-grid redundant solar power system where one 6-channel AC Master redundant Mini-Inverter and one or more 6-channel off-grid redundant Mini-Inverters daisy chain, each of which inverts the DC power from 6 solar panels to three-phase AC power to supply electricity to the AC load. In Group 1, the 6-channel AC Master redundant Mini-Inverter 100 is connected to Solar Panels 11, 12, 13, 14, 15, and 16. In Group 2, the 6-channel off-grid redundant Mini-Inverter 102 is connected to Solar Panels 21, 22, 23, 24, 25, and 26. In Group n, the 6-channel off-grid redundant Mini-Inverter 104 is connected to Solar Panels n1, n2, n3, n4, n5, and n6. There could be more groups in between Group 2 and Group n. The actual number will be based on the size of the solar power system as well as the number of the Mini-Inverters that can daisy chain without violating the power limit of the AC load 108. All Mini-Inverters from Group 1 to Group n daisy chain, where the AC input port of the first Mini-Inverter 104 is left open, and the AC output port of the last Mini-Inverter 100 is connected to the AC load 108 via the three-phase AC powerline 106.

Figure 8:
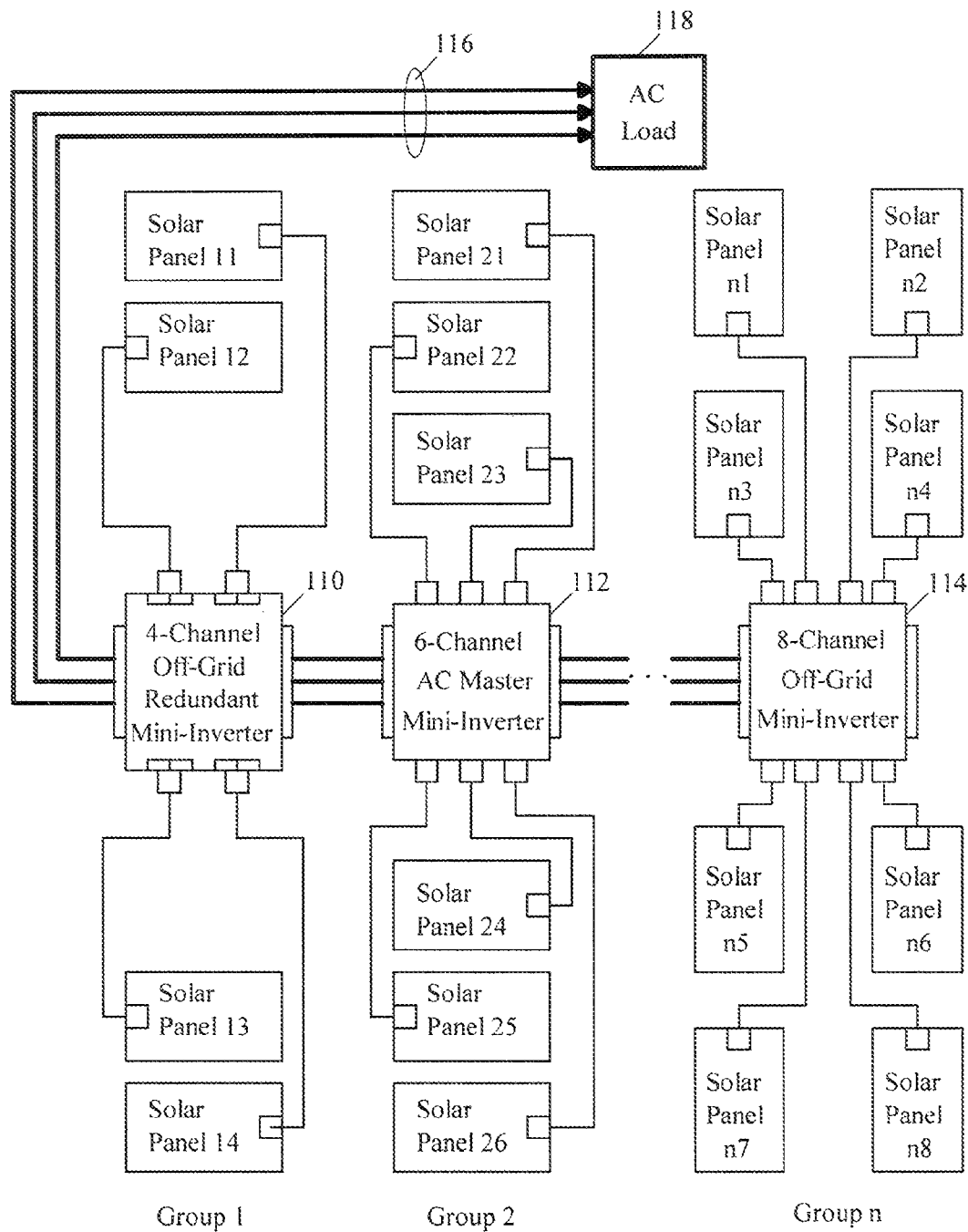

FIG. 8 is a block diagram illustrating a smart and scalable off-grid solar power system where one 4-channel off-grid redundant Mini-Inverter, one 6-channel AC Master Mini-Inverter, one 8-channel off-grid Mini-Inverter, and a number of off-grid Mini-Inverters in a mixed variety daisy chain to generate single-phase AC power to supply electricity to the AC load. In Group I, the 4-channel off-grid redundant Mini-Inverter 110 is connected to Solar Panels 11, 12, 13, and 14. In Group 2, the 6-channel AC Master Mini-Inverter 112 is connected to Solar Panels 21. 22, 23, 24, 25, and 26. In Group n, the 8-channel off-grid Mini-Inverter 114 is connected to Solar Panels n1, n2, n3, n4, n5, n6, n7, and n8. Then, all Mini-Inverters from Group 1 to Group n daisy chain, where the AC input port of the first Mini-Inverter 114 is left open, and the AC output port of the last Mini-Inverter 110 is connected to the AC load 118 via the AC powerline 116.

In a smart and scalable off-grid solar power system, one off-grid AC Master Mini-Inverter or one off-grid AC Master redundant Mini-Inverter as well as multiple off-grid Mini-Inverters and off-grid redundant Mini-Inverters can work together according to this invention. As described above, a mixed variety of off-grid Mini-Inverters and off-grid redundant Mini-Inverters can daisy chain through their AC input and output ports. This is a powerful and user-friendly design which provides scalability and can significantly reduce the total cost of solar power systems. On the other hand, since there must exist one and only one AC Master Mini-Inverter in a scalable off-grid solar power system according to this invention, it is a good idea to design the AC Master Mini-Inverter with redundant capabilities to assure that it can work in a harsh environment for a prolonged period of time.

Figure 9:
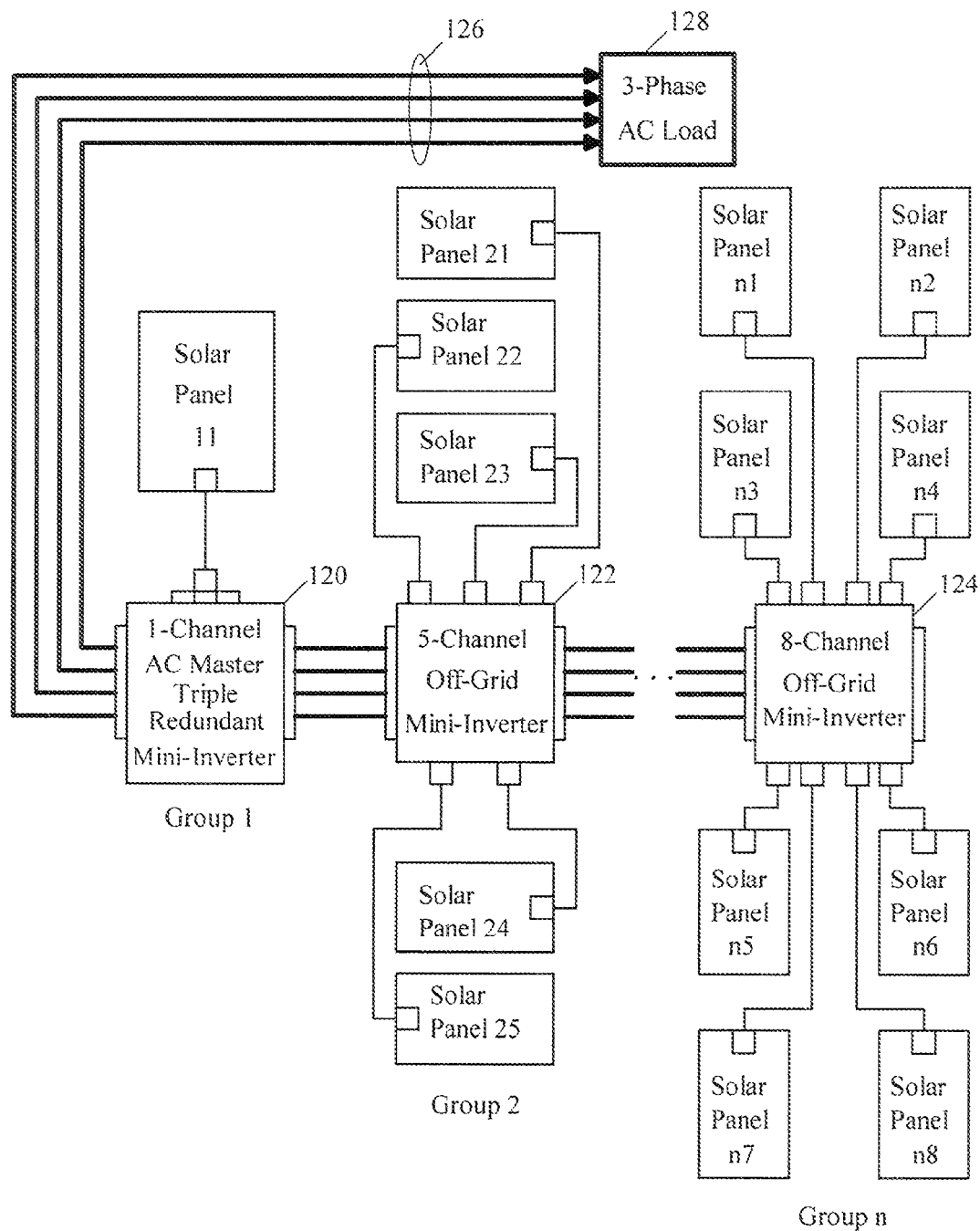

FIG. 9 is a block diagram illustrating a smart and scalable off-grid solar power system where one 1-channel AC Master triple redundant Mini-Inverter, one 5-channel off-grid Mini-Inverter, one 8-channel off-grid Mini-Inverter, and a number of Mini-Inverters in a mixed variety daisy chain to generate three-phase AC power to supply electricity to the AC load. In Group 1, the 1-channel AC Master triple redundant Mini-Inverter 120 is connected to the Solar Panel 11. In Group 2, the 5-channel off-grid Mini-Inverter 122 is connected to Solar Panels 21, 22, 23, 24, and 25. In Group n, the 8-channel off-grid Mini-Inverter 124 is connected to Solar Panels n1, n2, n3, n4, n5, n6, n7, and n8. Then; all Mini-Inverters from Group 1 to Group n daisy chain, where the AC input port of the first Mini-Inverter 124 is left open, and the AC output port of the last Mini-Inverter 120 is connected to a three-phase AC load 128 via the three-phase AC powerline 116.

Figure 10:
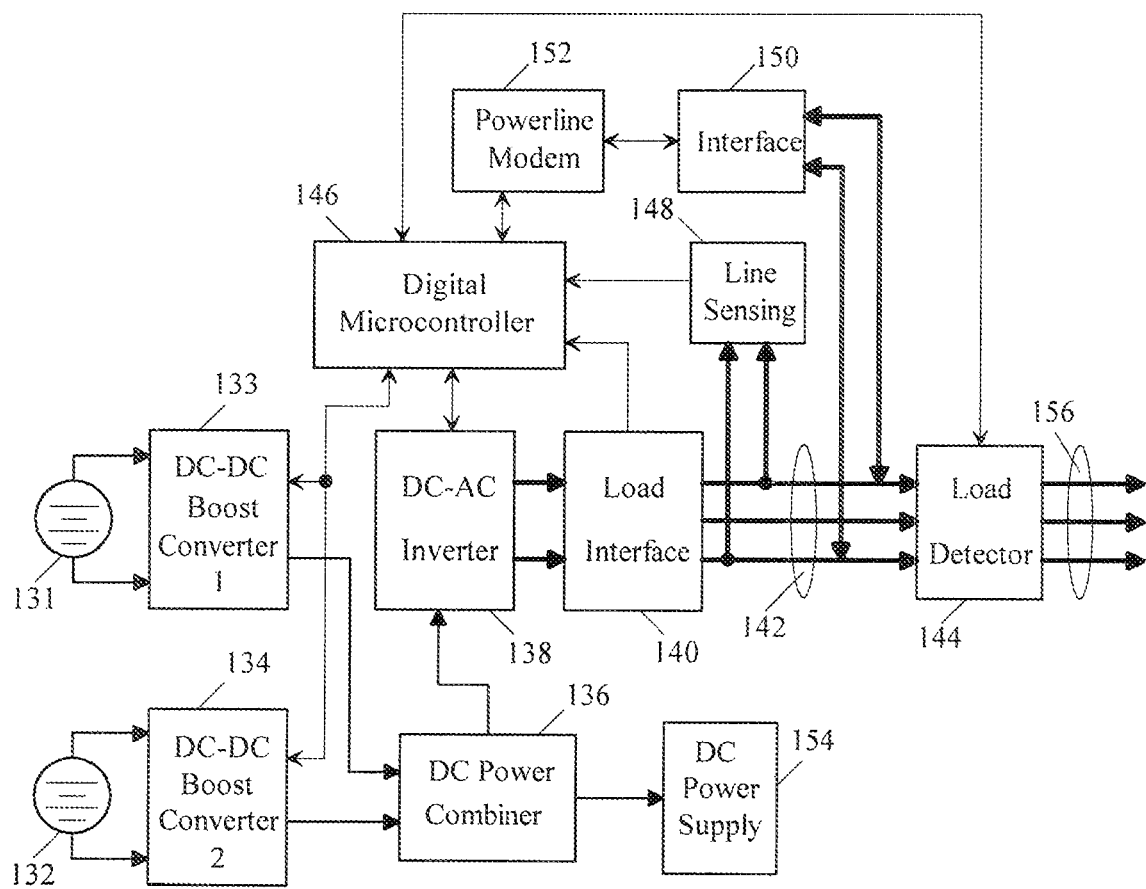
FIG. 10 is a block diagram illustrating a 2-channel off-grid AC Master Mini-Inverter that inverts the DC power from two DC sources to single-phase AC power.

FIG. 10 is a block diagram illustrating a 2-channel of AC Master Mini-Inverter that inverts the DC power from two DC sources to single-phase AC power. The AC Master Mini-Inverter comprises 2 DC-DC boost converters 133, 134, a DC power combiner 136, a DC-AC inverter 138, a load interface circuit 140, an internal AC powerline 142, a load detector 144, a digital microcontroller 146, a line sensing circuit 148, an interface circuit for powerline communications 150, a powerline communications Modem 152, a DC power supply 154, and an external AC powerline 156. The power from DC sources 131, 132 is delivered to the corresponding DC-DC boost converters 133, 134, respectively. The DC power is then combined in the DC power combiner 136. The total combined DC power is inverted to AC power within a user specified voltage range such as 120 VAC+/−10% or 240 VAC+/−10% by the DC-AC inverter 138. The generated AC power is sent to the AC load through the load interface circuit 140, internal AC powerline 142, load detector 144, and external AC powerline 156. A line sensing circuit 148 connected to the AC powerline 142 is used to detect if there is AC power on the powerline prior to the startup of the AC Master Mini-Inverter. The line sensing circuit 148 is also used for monitoring the load on the AC powerline for over voltage, under voltage, over current, or under current conditions so that the total AC output voltage can be regulated to protect the Mini-Inverters in the power generation system as well as the AC load.

The DC-DC boost converters that can be used in this embodiment are any of a number of well known converters described in the "Power Electronics Handbook" edited by Muhammad H. Rashid, published by Academic Press in 2007, including Buck Converter, Boost Converter, Buck-Boost Converter, Super-Lift Luo Converter, and Cascade Boost Converter. The DC-AC inverters that can be used in this embodiment are any of a number of well known DC-AC inverters described in the same book including Half-Bridge Inverter, Full-Bridge Inverter, Bipolar PWM Inverter, Unipolar PWM Inverter, and Sinusoidal PWM Inverter. The DC combiners used in this embodiment can be designed with a circuit that allow the output from all DC-DC boost converters to connect in parallel so that all DC currents will be added together. The Powerline Modem that can be used in this embodiment can be any of a number of commercially available integrated circuits capable of providing 2-way digital communications through a powerline. Other modules discussed in this embodiment including load interface, solid state switch, line sensing circuit, powerline interface circuit, and DC power supply can be implemented using one or more known combinations of conventional electronic components such as resisters, capacitors, inductors, solid-state switches, transformers, diodes, transistors, operational amplifiers, and ceramic filters, etc.

Figure 11:
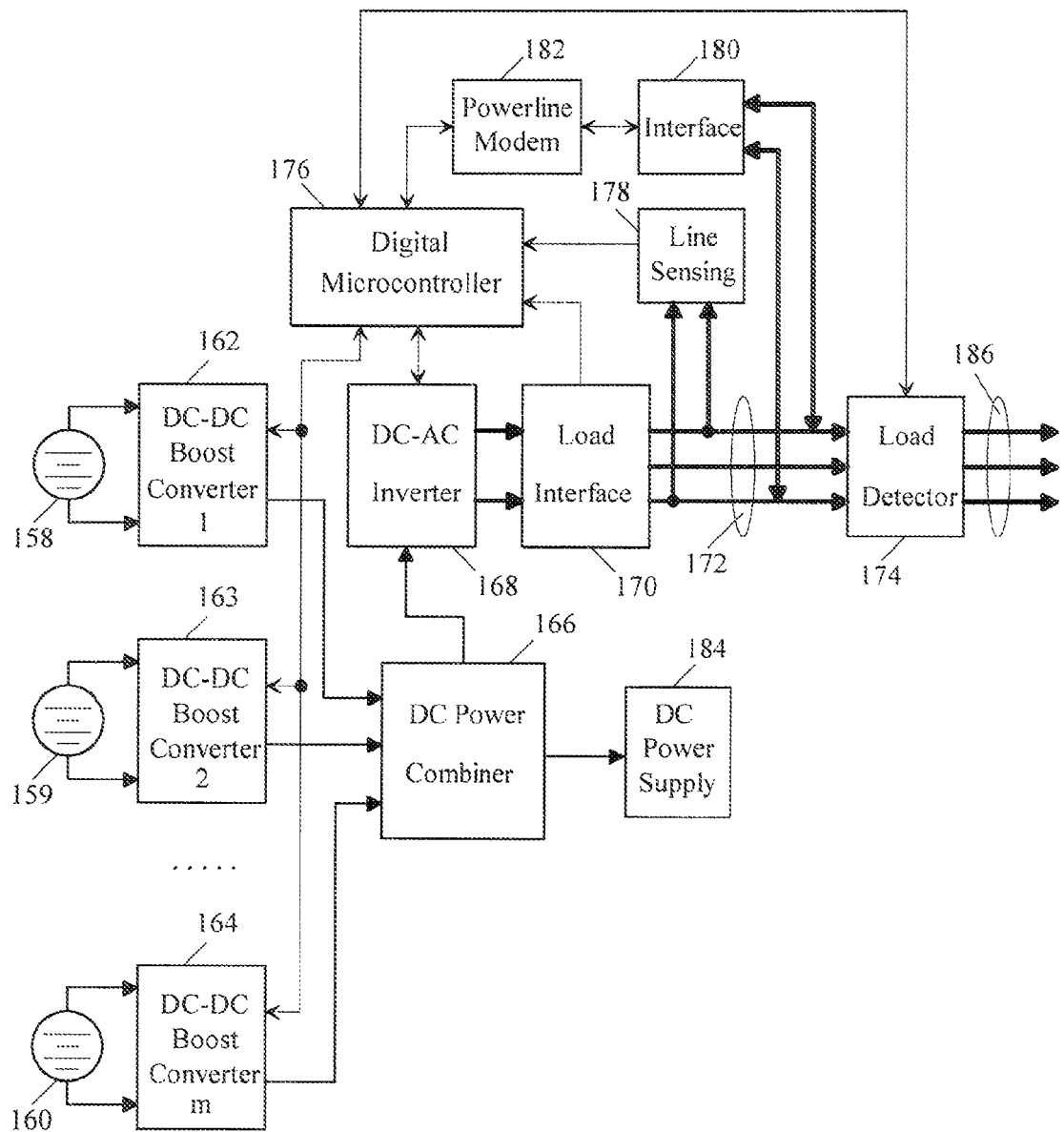
FIG. 11 is a block diagram illustrating an m-channel off-grid AC Master Mini-Inverter that inverts the DC power from m DC sources to single-phase AC power.
Figure 13:
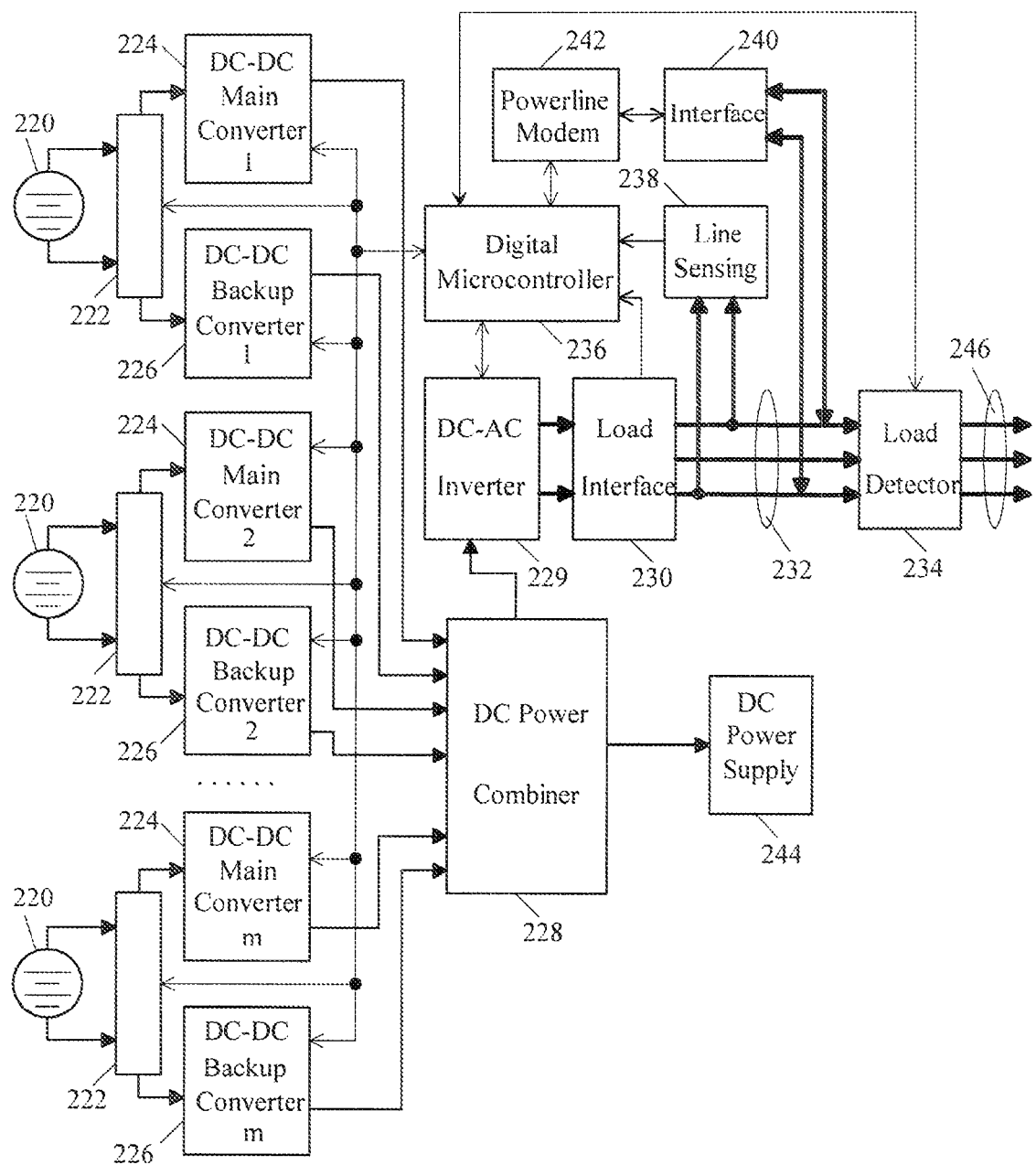
FIG. 13 is a block diagram illustrating an m-channel off-grid AC Master Redundant Mini-Inverter that inverts the DC power from m DC sources to single-phase AC power.

The load detector 144 as well as the ones to be described in FIGS. 11 and 13 are electronic circuits that can detect the impedance of the connected AC load. If no AC power is detected on the powerline, the Load Detector 144 checks the impedance of the AC powerline to determine if the connected AC load is within certain specifications. The Load Detector in this embodiment can be designed using standard LRC meter impedance measurement circuits and mechanism such as those described in the book, "The measurement of Lumped Parameter Impedance: A Metrology Guide" published by University of Michigan Library in January 1974.

A powerline communications Modem 152, which is isolated by an interface circuit 150, is used to establish a 2-way digital signal communication between the digital microcontroller 146 and the outside world through the AC powerline.

Figure 12:
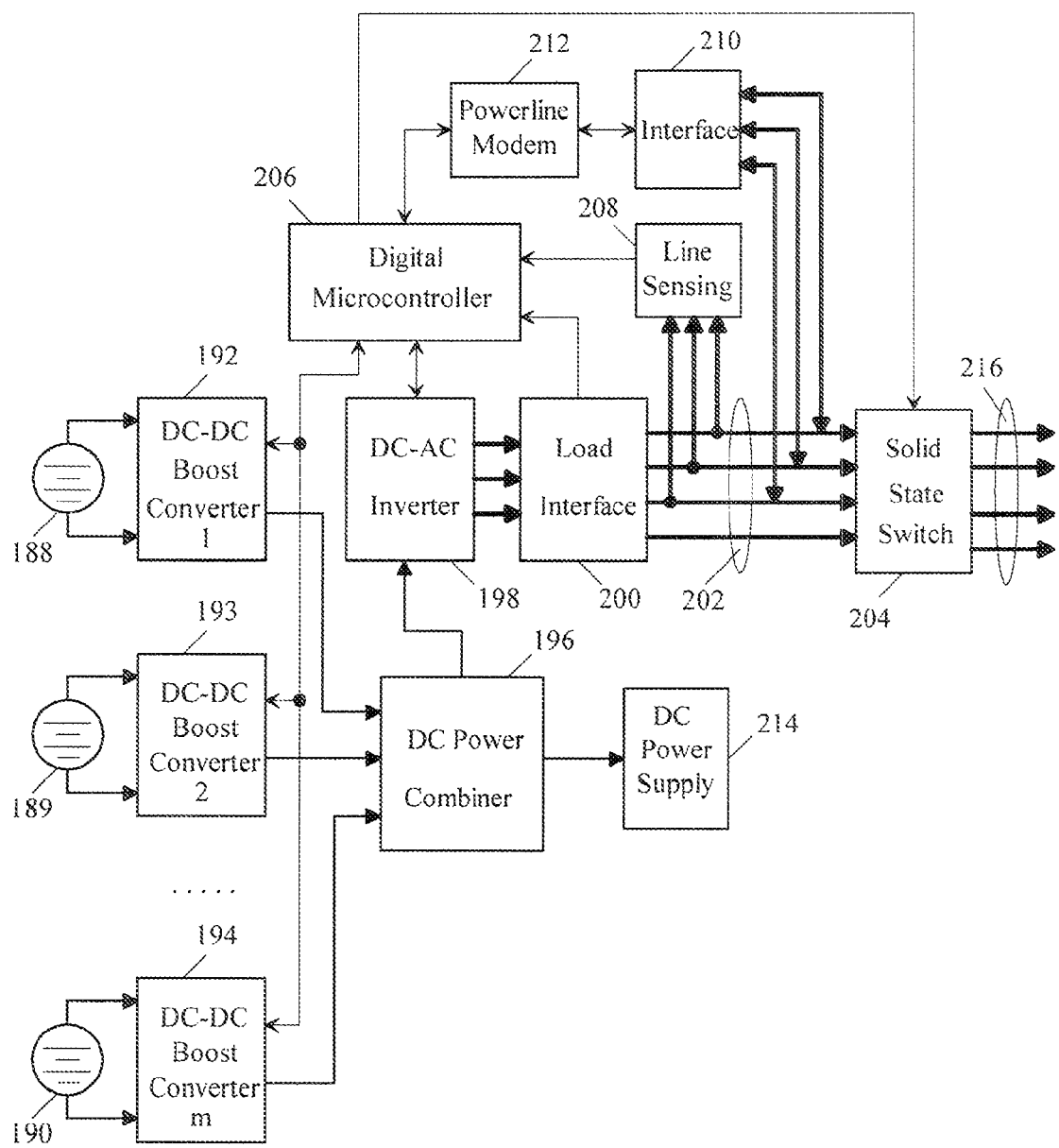
FIG. 12 is a block diagram illustrating an m-channel off-grid regular Mini-Inverter that inverts the DC power from m DC sources to three-phase AC power.

The external AC powerline 156 as well as the ones to be described in FIGS. 11, 12, and 13 is connected to an off-grid AC load.

The digital microcontroller 146 as well as the ones to be described in FIGS. 11, 12, and 13 are small computers on a single integrated circuit (IC) or a set of ICs that consists of a central processing unit (CPU) combined with functions and peripherals including a crystal oscillator, timers, watchdog, serial and analog I/Os, memory modules, pulse-width-modulation (PWM) generators, and user software programs. A 32-bit high-performance floating-point microcontroller is selected for this application.

For a regular off-grid Mini-Inverter discussed in this embodiment, the digital microcontroller is used to perform a number of tasks including (i) monitoring the DC boost voltage from each DC-DC boost converter, (ii) controlling the DC-DC boost converters, (iii) performing maximum power point tracking (MPPT) for each DC source, (iv) performing DC-AC inversion and AC power synchronization, (v) monitoring AC current and voltage for generated power amount and status, (vi) performing powerline communications, (vii) performing logic controls such as AC powerline switching and isolation. Redundant Mini-Inverters also perform redundancy functions, which has been described in the U.S. patent application No. 61/442,991.

For an AC Master Mini-Inverter discussed in this embodiment, the digital microcontroller performs the tasks including (i) monitoring the DC boost voltage from each DC-DC boost converter, (ii) controlling the DC-DC boost converters, (iii) performing maximum power point tracking (MPPT) for each DC source, (iv) performing DC-AC inversion, (v) monitoring AC current and voltage for generated power amount and status, (vi) performing powerline communications, (vii) checking the impedance of the AC powerline to determine if the connected AC load is within certain specifications, (viii) initially energizing the AC powerline that has no power running to it, (ix) continually delivering AC power to the AC powerline to allow the other off-grid Mini-Inverters also connected on the same powerline to synchronize the AC power being produced, (x) continually checking and determining whether the AC load is too large or too small for the power generation system to handle, and (xi) turning the power off and triggering an error signal if the load is too large or too small.

Model-Free Adaptive (MFA) control software embedded in the digital microcontroller 146 as well as the ones to be described in FIGS. 11, 12, and 13 can be used to control the DC-DC boost converter to achieve better performance and higher conversion efficiency. MFA optimizers running inside the digital microcontroller can be used to provide maximum power point tracking (MPPT) to allow the Mini-Inverter to achieve optimal power production. The MFA control and optimization technologies have been described in U.S. Pat. Nos. 6,055,524, 6,556,980, 6,360,131, 6,684,115, 6,684,112, 7,016,743, 7,142,626, 7,152,052, 7,415,446, related international patents, and other pending patents.

The DC power combiner 136 as well as the ones to be described in FIGS. 11, 12, and 13 provides adequate power to the DC power supply 154 as well as the ones to be described in FIGS. 11, 12, and 13, which supply DC power to the electronic components of the Mini-Inverter.

FIG. 11 is a block diagram illustrating an m-channel off-grid AC Master Mini-Inverter that inverts the DC power from m DC sources to single-phase AC power. The Mini-Inverter comprises m DC-DC boost converters 162, 163, . . . , 164, a DC power combiner 166, a DC-AC inverter 168, a load interface circuit 170, an internal AC powerline 172, a load detector 174, a digital microcontroller 176, a line sensing circuit 178, an interface circuit for powerline communications 180, a powerline communications Modem 182, a DC power supply 184, and an external AC powerline 186. The power from DC sources 158, 159, . . . , 160 is delivered to the corresponding DC-DC boost converters 162, 163, . . . , 164, respectively. The DC power is then combined in the DC power combiner 166. The total combined DC power is inverted to AC power within a user specified voltage range such as 120 VAC+/−10% or 240 VAC+/−10% by the DC-AC inverter 168. The generated AC power is sent to the AC load through the load interface circuit 170, internal AC powerline 172, load detector 174, and external AC powerline 186. A line sensing circuit 178 connected to the AC powerline 172 is used to detect if there is AC power on the powerline prior to the startup of the AC Master Mini-Inverter. The line sensing circuit 178 is also used for monitoring the load on the AC powerline for over voltage, under voltage, over current, or under current conditions so that the total AC output voltage can be regulated to protect the Mini-Inverters in the power generation system as well as the AC load. A powerline communications Modem 182, which is isolated by an interface circuit 180, is used to establish a 2-way digital signal communication between the digital microcontroller 176 and the outside world through the AC powerline.

FIG. 12 is a block diagram illustrating an m-channel off-grid regular Mini-Inverter that inverts the DC power from m DC sources to three-phase AC power. The. Mini-Inverter comprises m DC-DC boost converters 192, 193, . . . , 194, a DC power combiner 196, a DC-AC inverter 198, a load interface circuit 200, an internal AC powerline 202, a solid-state switch circuit 204, a digital microcontroller 206, a line sensing circuit 208, an interface circuit for powerline communications 210, a powerline communications Modem 212, a DC power supply 214, and an external AC powerline 216. The power from DC sources 188, 189, . . . , 190 is delivered to the corresponding DC-DC boost converters 192, 193, . . . , 194, respectively. The DC power is then combined in the DC power combiner 196. The total combined DC power is inverted to AC power within a user specified voltage range such as 120 VAC+/−10% or 240 VAC+/−10% by the DC-AC inverter 198. The generated AC power is sent to the AC load through the load interface circuit 200, internal AC powerline 202, solid-state switch 204, and external AC powerline 216. A line sensing circuit 208 connected to the AC powerline 202 is used to detect the phase and zero-crossing point of the AC signal on the AC power line. The phase and zero-crossing point signals are sent to the digital microcontroller 206 for AC power synchronization to assure that the power inverter provides high quality synchronized power to the AC load. The solid-state switch mechanism 204 can be used to automatically disconnect the connections between the Internal AC Powerline 202 and External AC Powerline 216.

FIG. 13 is a block diagram illustrating an m-channel off-grid AC Master Redundant Mini-Inverter that inverts the DC power from m DC sources to single-phase AC power. The Mini-Inverter comprises m DC input channel selectors 222, m main DC-DC boost converters 224, m backup DC-DC boost converters 226, a DC power combiner 228, a DC-AC inverter 229, a load interface circuit 230, an internal AC powerline 232, a load detector 234, a digital microcontroller 236, a line sensing circuit 238, an interface circuit for powerline communications 240, a powerline communications Modem 242, a DC power supply 244, and an external AC powerline 246.

For each of the in input channels, the power from the DC source 220 is delivered to either the main DC-DC boost converter 224 or the backup DC-DC boost converter 226 through the DC input channel selector 222. Based on the command from the digital microcontroller 236, each DC input channel selector 222 can direct the DC power to the selected DC-DC boost converter. The DC power from the in main converters 224 and from the in backup converters 226 is then combined in the DC power combiner 228. For each of the m input channels, the main converter will supply power to the DC power combiner if it is working and the backup converter produces zero power. If the main converter fails, its corresponding backup converter will be automatically switched to supply power to the DC power combiner.

The total combined DC power from the DC power combiner 228 is then inverted to AC power within a user specified voltage range such as 120 VAC+/−10% or 240 VAC+/−10% by the DC-AC inverter 229. The generated AC power is sent to the AC load through the load interface circuit 230, internal AC powerline 232, load detector 234, and external AC powerline 246. A line sensing circuit 238 connected to the AC powerline 232 is used to detect if there is AC power on the powerline prior to the startup of the AC Master Mini-Inverter. The line sensing circuit 238 is also used for monitoring the load on the AC powerline for over voltage, under voltage, over current, or under current conditions so that the total AC output voltage can be regulated to protect the Mini-Inverters in the power generation system as well as the AC load. A powerline communications Modem 242, which is isolated by an interface circuit 240, is used to establish a 2-way digital signal communication between the digital microcontroller 236 and the outside world through the AC powerline.

Figure 14:
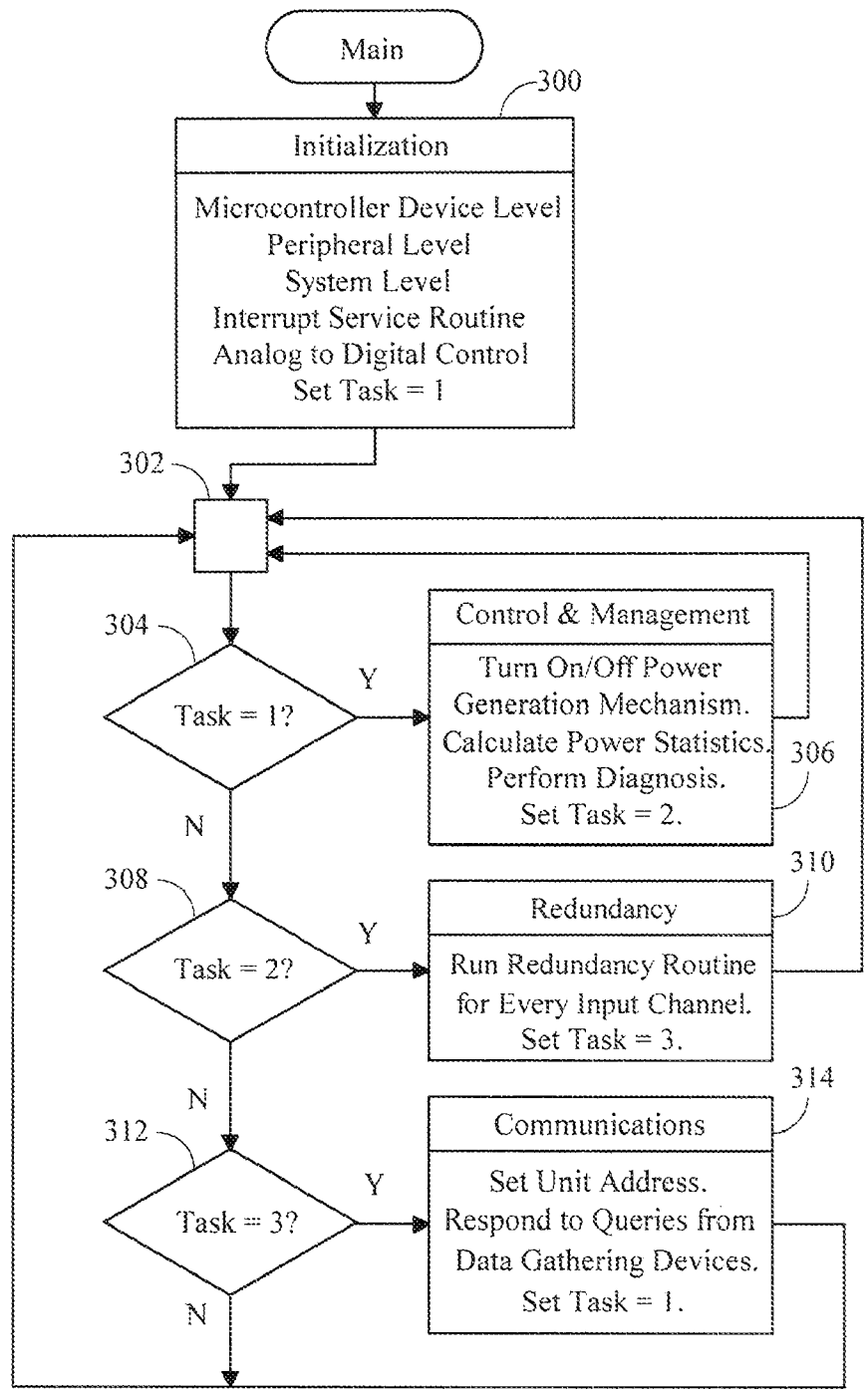
FIG. 14 is a flow chart describing the main software program running in the digital microcontroller of a smart and scalable off-grid Mini-Inverter, which includes Control & Management tasks, Redundancy tasks, and Communication tasks.

FIG. 14 is a flow chart describing the main software program running in the digital microcontroller of a smart and scalable off-grid Mini-Inverter, which includes Control & Management tasks, Redundancy tasks, and Communication tasks. At Block 300, initialization is taking place in the microcontroller device level, peripheral level, system level, and for the interrupt service routine and analog and digital control routines. More specifically, initialization will include but is not limited to setting up registers, I/Os, and timers and enabling interrupts for the interrupt service routine. At the end, it will set Task=1.

In the main program, there are three major tasks. Task 1 is related to the control and management of the Mini-Inverter. Task 2 is related to the redundancy of the Mini-Inverter. Task 3 is related to the communications of the Mini-Inverter to the outside world through the powerline Modem. After initialization, the main program enters the main loop entry point 302 and then goes to Block 304.

At Block 304, the program checks to see if Task 1 is scheduled to run. If the answer is Yes, the program will execute the functions in Block 306 to (i) turn on/off the power generation mechanism based on the conditions of the DC power source(s), the Mini-Inverter, and the AC powerline, (ii) calculate power statistics such as the amount of power generated during a certain period of time, and (iii) perform system diagnosis. Then, it sets Task=2 and returns to Block 302, which is the entry of the main loop.

When the program continues, it will go through Block 304, and reach Block 308. At Block 308, the program checks to see if Task 2 is scheduled to run. If the answer is Yes, the program will execute the functions in Block 310 to run the redundancy routine for each input channel that the Mini-Inverter has. Then, it sets Task=3 and returns to Block 302.

When the program further continues, it will go through Block 304 and 308, and reach Block 312. At Block 312, the program checks to see if Task 3 is scheduled to run. If the answer is Yes, the program will execute the functions in Block 314 to (i) set the unit address for the Mini-Inverter, and (ii) respond to queries from data gathering or acquisition devices to report the power statistics. Then, it sets Task=1 and returns to Block 302. The main program runs continuously based on a preset loop rate to execute the scheduled tasks. At any time an interrupt is triggered, the digital microcontroller immediately processes the pending interrupt service routine.

The key components, functions, and steps in the interrupt service routine embedded in the digital microcontroller are described in the U.S. patent application Ser. No. 12/837,162.

Figure 15:
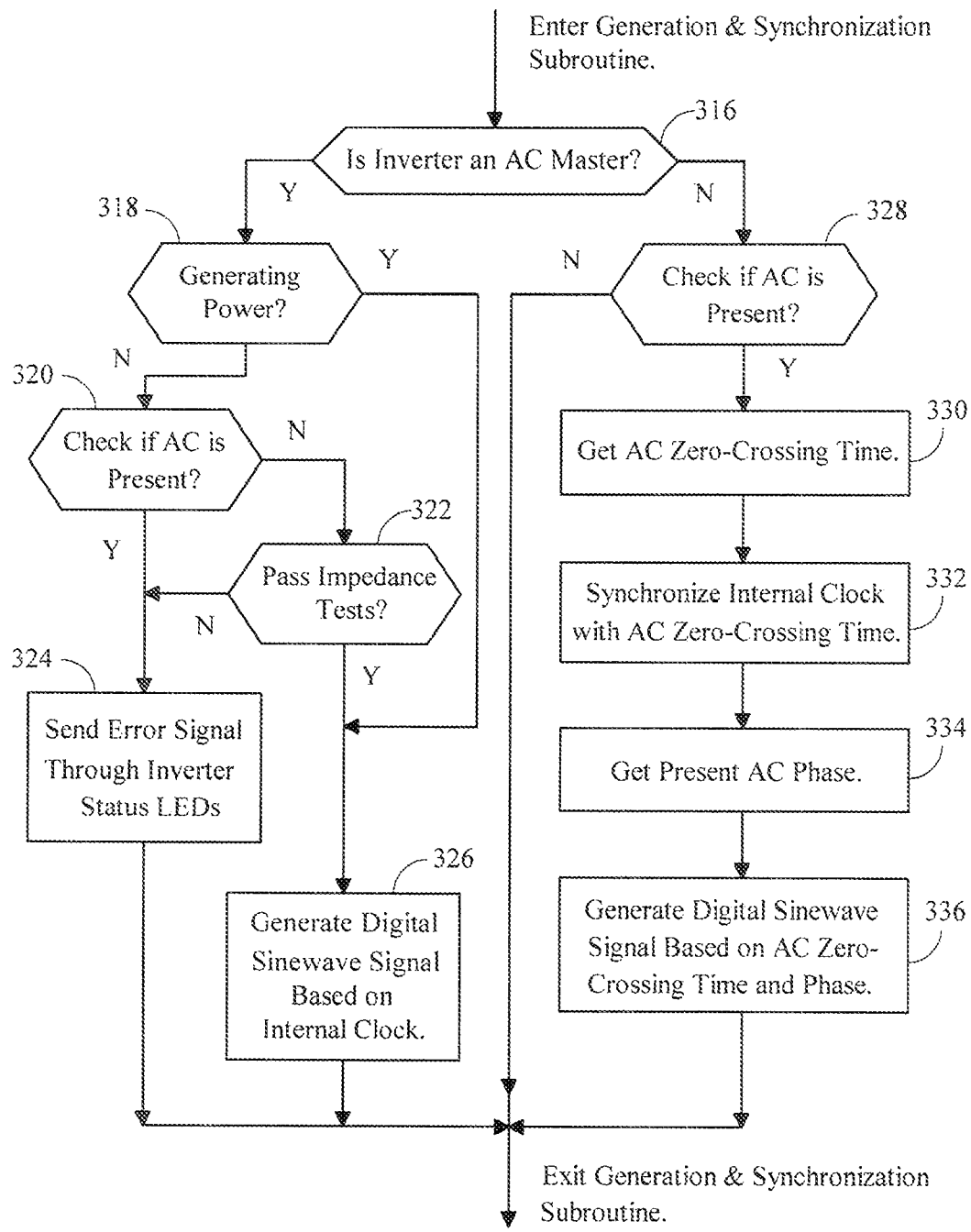
FIG. 15 is a flow chart describing the Generation and Synchronization Subroutine, which is invoked by the Power Generation Mechanism of FIG. 14, running in the digital microcontroller of a smart and scalable off-grid Mini-Inverter that can be an off-grid AC Master Mini-Inverter or a regular off-grid Mini-Inverter according to this invention.

FIG. 15 is a flow chart describing the Generation and Synchronization Subroutine, which is invoked by the Power Generation Mechanism at Block 306, running in the digital microcontroller of a smart and scalable off-grid Mini-Inverter that can be an off-grid AC Master Mini-Inverter or a regular off-grid Mini-Inverter according to this invention. At Block 316, the subroutine checks to see if the Mini-Inverter is an AC Master. If the answer is Yes, it will go to Block 318 to further check if the AC Master is generating power. If it is, it means the AC Master is working and it will go to Block 326. If it is Not, the subroutine will go to Block 320 to further check if AC is present on the AC power line. If the answer is Yes, the subroutine will go to Block 324 and send an error signal through the Status LEDs (light-emitting diodes) of the Mini-Inverter to indicate that the off-grid AC Master Mini-Inverter is connected to a power line that has AC power. People may have mistakenly connected the off-grid AC Master Mini-Inverter to the AC grid. Since the AC Master Mini-Inverter has detected this abnormal condition, it will not even start-up to avoid potential problems. The subroutine will exit and then return at the next program cycle.

At Block 320, if the AC Master Mini-Inverter did not see that AC is present, it will go to Block 322 to do the AC load impedance check. If the AC load does not pass the impedance requirement tests based on certain specifications, the subroutine will go to Block 324 and send an error signal through the Status LEDs to indicate that the AC Load has some problems and needs to be checked out. The subroutine will exit and then return at the next program cycle.

At Block 322, if the AC load passes the impedance requirement tests based on certain specifications, the subroutine will go to Block 326, where the Mini-Inverter will generate digital Sinewave signals based on the internal clock. As discussed, the AC Master's main job is to produce a lead Sinewave signal for the rest of the off-grid Mini-Inverters to follow.

At Block 316, if the inverter is not an AC Master, it means it is a regular off-grid Mini-Inverter, the subroutine will proceed to Block 328 to see if AC is present. For a regular off-grid Mini-Inverter, it works just like a grid-tie Mini-Inverter. It is connected to an AC powerline where there must exist a leading AC signal before the Mini-Inverter can start to generate power, since its generated AC power needs to be synchronized with the leading AC signal. Therefore, at Block 328, if the answer is No, it means there is no AC on the powerline. In this case, the subroutine will exit and then return at the next program cycle.

At Block 328, if the answer is Yes, it means there is a leading AC signal. The subroutine will go to Block 330. At Block 330, the subroutine gets the AC Zero-Crossing Time of the AC signal. At Block 332, it synchronizes the internal clock with the AC Zero-Crossing Time. At Block 334, it gets the present AC Phase; At Block 336, it generates digital Sinewave signal based on AC Zero-Crossing Time and Phases. Then, the program exits the Generation and Synchronization Subroutine. At this time, the Mini-Inverter is enabled to generate AC power.

To summarize, this patent introduces a novel concept: Grid Flexibility. That is, the same family of the smart and scalable power inverters can be designed to include both Grid-tie and Off-grid Mini-Inverters. The Smart and Scalable Off-grid Mini-Inverters described in this patent offer a cost effective clean energy solution for a broad range of off-grid applications and can play an important role in our mission to build a world that is run on clean energies.

The invention claimed is:

1. A system for providing AC power to an AC load from a plurality of individual DC power sources each having a DC power output port, comprising:
   a) a plurality of power inverters, each of said power inverters having one DC power input port, an AC power input port, and an AC power output port;
   b) said AC power output port of each inverter being connected in a daisy chain to the AC power input port of the next inverter, except for the AC power input port of the first inverter being left open, and the AC power output port of the last inverter being connected to the AC load;
   c) each of the power inverters including:
      i) a DC-DC boost converter arranged to convert the voltage of a DC power source to a higher DC voltage suitable for inversion;
      ii) a DC-AC inverter connected to said DC-DC boost converter and arranged to invert the DC power to AC power;
      iii) an internal AC powerline that allows the generated AC power to be sent to the AC load through an external AC powerline;
      iv) a load interface circuit connected to said DC-AC inverter and to said internal AC powerline, said load interface circuit being arranged to filter high-frequency components out of the said DC-AC inverter's AC output;
      v) a digital microcontroller connected to said DC-DC boost converter, DC-AC inverter, and load interface circuit, said microcontroller arranged to monitor the DC boost voltage, control the DC-DC boost converter, perform maximum power point tracking (MDPT), perform DC-AC inversion, monitor AC current and voltage for generated power amount and status, perform powerline communications, and perform logic controls such as AC powerline switching and isolation; and
      vi) a powerline modem connected to said microcontroller and said internal AC powerline through an interface circuitry arranged to establish a 2-way digital signal communication between the digital microcontroller and the outside world through the external AC powerline;

d) one of the power inverters further including:
  i) a load detector connected to said internal AC powerline and external AC powerline, and arranged to detect the impedance of the connected AC load;
  ii) said digital microcontroller further connected to the load detector and arranged to check the impedance of the AC load to determine if it is within predetermined specifications, initially energize the internal and external AC powerline, continually deliver AC power to the internal and external AC powerline to allow the other power inverters also connected on the same external AC powerline to synchronize the AC power being produced, continually check and determine whether the AC load is too large or too small for the power generation system to handle, and turn the power off and trigger an error signal if the load is too large or too small; and
  iii) a line sensing circuit connected to said internal AC powerline and said microcontroller, and arranged to detect if there is AC power on the internal AC powerline prior to the startup of the inverter, and to monitor the internal AC powerline for over voltage, under voltage, over current, or under current conditions;
e) each of the other power inverters further including:
  i) said digital microcontroller arranged to perform AC power synchronization;
  ii) a line sensing circuit connected to said internal AC powerline and said microcontroller for detecting the phase and zero-crossing point of the incoming AC power from the external AC powerline; and
  iii) a solid state switch connected to said internal AC powerline and external AC powerline, and arranged to disconnect said internal AC powerline from the external AC powerline during the non-generation time.

2. A system for providing AC power to an AC load from a plurality of individual DC power sources each having a DC power output port, comprising:
  a) a plurality of power inverters, each of said power inverters having m DC power input ports, where m is an integer greater than or equal to two, an AC power input port, and an AC power output port;
  b) said AC power output port of each inverter being connected in a daisy chain to the AC power input port of the next inverter, except for the AC power input port of the first inverter being left open, and the AC power output port of the last inverter being connected to the AC load;
  c) each of the power inverters including:
    i) m number of DC-DC boost converters arranged to convert the voltage of a DC power source to a higher DC voltage suitable for inversion;
    ii) a DC power combiner connected to said m number of DC-DC boost converters for combining the DC output from all DC-DC boost converters and allowing said DC-DC boost converters to connect in parallel so that all DC currents are added together;
    iii) a DC-AC inverter connected to said DC power combiner and arranged to invert the DC power to AC power;
    iv) an internal AC powerline that allows the generated AC power to be sent to the AC load through an external AC powerline;
    v) a load interface circuit connected to said DC-AC inverter and to said internal AC powerline, said load interface circuit being arranged to filter high-frequency components out of the said DC-AC inverter's AC output;
    vi) a digital microcontroller connected to said DC-DC boost converters, DC-AC inverter, and load interface circuit, said microcontroller arranged to monitor the DC boost voltage, control the DC-DC boost converter, perform maximum power point tracking (MPPT), perform DC-AC inversion, monitor AC current and voltage for generated power amount and status, perform powerline communications, and perform logic controls such as AC powerline switching and isolation; and
    vii) a powerline modem connected to said microcontroller and said internal AC powerline through an interface circuitry arranged to establish a 2-way digital signal communication between the digital microcontroller and the outside world through the external AC powerline;
  d) one of the power inverters further including:
    i) a load detector connected to said internal AC powerline and external AC powerline, and arranged to detect the impedance of the connected AC load;
    ii) said digital microcontroller further connected to the load detector and arranged to check the impedance of the AC load to determine if it is within predetermined specifications, initially energize the internal and external AC powerline, continually deliver AC power to the internal and external AC powerline to allow the other power inverters also connected on the same external AC powerline to synchronize the AC power being produced, continually check and determine whether the AC load is too large or too small for the power generation system to handle, and turn the power off and trigger an error signal if the load is too large or too small; and
    iii) a line sensing circuit connected to said internal AC powerline and said microcontroller, and arranged to detect if there is AC power on the internal AC powerline prior to the startup of the inverter, and to monitor the internal AC powerline for over voltage, under voltage, over current, or under current conditions;
  e) each of the other power inverters, further including:
    i) said digital microcontroller arranged to perform AC power synchronization;
    ii) a line sensing circuit connected to said internal AC powerline and said microcontroller for detecting the phase and zero-crossing point of the incoming AC power from the external AC powerline; and
    iii) a solid state switch connected to said internal AC powerline and external AC powerline, and arranged to disconnect said internal AC powerline from the external AC powerline during the non-generation time.

3. The system of claim 2, in which the output of each of said power inverters is single-phase AC or three-phase AC.

4. The system of claim 2, in which said digital microcontroller includes Model-Free Adaptive (MFA) controllers which control the DC-DC boost converter, and MFA optimizers which provide maximum power point tracking (MPPT) to allow the power inverter to achieve optimal power production.

5. A DC-to-AC off-grid AC Master power inverter, comprising:
  a) one DC power input port;
  b) one AC power output port arranged to supply AC power to an AC load;
  c) a DC-DC boost converter arranged to convert the voltage of a DC power source to a higher DC voltage suitable for inversion;

d) a DC-AC inverter connected to said DC-DC boost converter and arranged to invert the DC power to AC power;
e) an internal AC powerline that allows the generated AC power to be sent to the AC load through an external AC powerline;
f) a load interface circuit connected to said DC-AC inverter and to said internal AC powerline, said load interface circuit being arranged to filter high-frequency components out of the said DC-AC inverter's AC output;
g) a load detector connected to said internal AC powerline and external AC powerline, and arranged to detect the impedance of the connected AC load;
h) a digital microcontroller connected to said DC-DC boost converter, DC-AC inverter, load interface circuit, and load detector, said microcontroller arranged to monitor the DC boost voltage, control the DC-DC boost converter, perform maximum power point tracking (MPPT), perform DC-AC inversion, monitor AC current and voltage for generated power amount and status, perform powerline communications, check the impedance of the AC load to determine if it is within predetermined specifications, initially energize the internal and external AC powerline, continually deliver AC power to the internal and external AC powerline to allow the other power inverters also connected on the same external powerline to synchronize the AC power being produced, continually check and determine whether the AC load is too large or too small for the power generation system to handle, and turn the power off and trigger an error signal if the load is too large or too small;
i) a powerline modem connected to said microcontroller and said internal AC powerline through an interface circuitry arranged to establish a 2-way digital signal communication between the digital microcontroller and the outside world through the external AC powerline; and
j) a line sensing circuit connected to said internal AC powerline and said microcontroller, and arranged to detect if there is AC power on the internal AC powerline prior to the startup of the inverter, and to monitor the internal AC powerline for over voltage, under voltage, over current, or under current conditions.

6. A multiple channel off-grid AC Master DC-to-AC power inverter, comprising:
a) at least two DC power input ports;
b) one AC power output port arranged to supply AC power to an AC load;
c) for each DC power input port, a DC-DC boost converter arranged to convert the voltage of a DC power source to a higher DC voltage suitable for inversion;
d) a DC power combiner connected to said DC-DC boost converters for combining the DC output from all DC-DC boost converters and allowing the said DC-DC boost converters to connect in parallel so that all DC currents are added together;
e) a DC-AC inverter connected to said DC power combiner and arranged to invert the DC power to AC power;
f) an internal AC powerline that allows the generated AC power to be sent to the AC load through an external AC powerline;
g) a load interface circuit connected to said DC-AC inverter and to said internal AC powerline, said load interface circuit being arranged to filter high-frequency components out of the said DC-AC inverter's AC output;
h) a load detector connected to said internal AC powerline and external AC powerline, and arranged to detect the impedance of the connected AC load;
i) a digital microcontroller connected to said DC-DC boost converter, DC-AC inverter, load interface circuit, and load detector, said microcontroller arranged to monitor the DC boost voltage, control the DC-DC boost converter, perform maximum power point tracking (MDPT), perform DC-AC inversion, monitor AC current and voltage for generated power amount and status, perform powerline communications, check the impedance of the AC load to determine if it is within predetermined specifications, initially energize the internal and external AC powerline, continually deliver AC power to the internal and external AC powerline to allow the other power inverters also connected on the same external powerline to synchronize the AC power being produced, continually check and determine whether the AC load is too large or too small for the power generation system to handle, and turn the power off and trigger an error signal if the load is too large or too small;
j) a powerline modem connected to said microcontroller and said internal AC powerline through an interface circuitry arranged to establish a 2-way digital signal communication between the digital microcontroller and the outside world through the external AC powerline;
k) a line sensing circuit connected to said internal AC powerline and said microcontroller, and arranged to detect if there is AC power on the internal AC powerline prior to the startup of the inverter, and to monitor the internal AC powerline for over voltage, under voltage, over current, or under current conditions; and
l) a power supply connected to said DC power combiner and arranged to supply DC power to the electronic components of said power inverter.

7. The inverter of claim 6, in which the output of said inverter is single-phase AC or three-phase AC.

8. The inverter of claim 6, in which said digital microcontroller includes Model-Free Adaptive (MFA) controllers which control the DC-DC boost converter, and MFA optimizers which provide maximum power point tracking (MPPT) to allow the power inverter to achieve optimal power production.

9. The inverter of claim 6, in which the said digital microcontroller is programmed with a main program to iteratively:
a) turn on and off the inverter's generation mechanism based on the DC power source input and conditions of the inverter and AC powerline;
b) calculate the inverter's power statistics such as the amount of power generated during a predetermined period of time;
c) perform diagnostics for the inverter's status and operation;
d) run redundancy routine for every input channel;
e) set the inverter's unit address;
f) perform powerline communications; and
g) respond to queries from data gathering or acquisition devices to report the power statistics.

10. The inverter of claim 6, in which said digital microcontroller is further programmed with a generation and synchronization subroutine to iteratively:
a) check if the inverter is an AC Master;
b) if a) is positive, check if it is generating power;
c) if b) is negative, check if AC is present;
d) if c) is positive, send an error signal through an inverter status LED to alert the fact that the off-grid AC Master inverter is connected to a powerline that has AC power;
e) if c) is negative, check if the AC load passes the impedance requirement tests based on predetermined specifications;

f) if e) is positive, generate AC power and digital Sinewave signals based on an internal clock;

g) if e) is negative, send an error signal through the status LED;

h) if a) and b) are positive, keep generating power and the digital Sinewave signals;

i) if a) is negative, check if AC is present;

j) if i) is negative, exit the generation and synchronization subroutine; and k) if i) is positive, get AC zero-crossing time, synchronize internal clock with AC zero-crossing time, get present AC phase, and generate AC power based on the AC zero-crossing time and phase.

11. A multiple channel regular off-grid DC-to-AC power inverter, comprising:

a) at least two DC power input ports;

b) one AC power output port arranged to supply AC power to an AC load;

c) for each DC power input port, a DC-DC boost converter arranged to convert the voltage of a DC power source to a higher DC voltage suitable for inversion;

d) a DC power combiner connected to said DC-DC boost converters for combining the DC output from all DC-DC boost converters and allowing the said DC-DC boost converters to connect in parallel so that all DC currents are added together;

e) a DC-AC inverter connected to said DC power combiner and arranged to invert the DC power to AC power;

f) an internal AC powerline that allows the generated AC power to be sent to the AC load through an external AC powerline;

g) a load interface circuit connected to said DC-AC inverter and to said internal AC powerline, said load interface circuit being arranged to filter high-frequency components out of the said DC-AC inverter's AC output;

h) a digital microcontroller connected to said DC-DC boost converters, DC-AC inverter, load interface circuit, line sensing circuit, and load detector, said microcontroller arranged to monitor the DC boost voltage, control the DC-DC boost converter, perform maximum power point tracking (MPPT), perform DC-AC inversion and AC power synchronization, monitor AC current and voltage for generated power amount and status, perform powerline communications, and perform logic controls such as AC powerline switching and isolation;

i) a powerline modem connected to said microcontroller and said internal AC powerline through an interface circuitry arranged to establish a 2-way digital signal communication between the digital microcontroller and the outside world through the external AC powerline;

j) a line sensing circuit connected to said internal AC powerline and said microcontroller for detecting the phase and zero-crossing point of the incoming AC power from the external AC powerline;

k) a solid state switch connected to said internal AC powerline and external AC powerline, and arranged to disconnect said internal AC powerline from the external AC powerline during the non-generation time; and l) a power supply connected to said DC power combiner and arranged to supply DC power to the electronic components of said power inverter.

12. A scalable DC to AC power inversion system for providing AC power to an AC load from a plurality of individual DC power sources each having a DC power output port, comprising:

a) a plurality of power inverters, each of said power inverters having at least one DC power input port, an AC power input port, and an AC power output port;

b) said AC power output port of each inverter being connected in a daisy chain to the AC power input port of the next inverter, except for the AC power input port of the first inverter being left open, and the AC power output port of the last inverter being connected to the AC load; and c) whereby said system is incrementally scalable by adding or subtracting DC power sources and daisy-chained inverters.

13. The system of claim 12, in which the output of each of said power inverters is single-phase AC or three-phase AC.

14. The system of claim 12, wherein each of the said power inverters comprises:

a) at least two DC power input ports;

b) one AC power output port arranged to supply AC power to an AC load;

c) for each DC power input port, a DC-DC boost converter arranged to convert the voltage of a DC power source to a higher DC voltage suitable for inversion;

d) a DC power combiner connected to said DC-DC boost converters for combining the DC output from all DC-DC boost converters and allowing the said DC-DC boost converters to connect in parallel so that all DC currents are added together;

e) a DC-AC inverter connected to said DC power combiner and arranged to invert the DC power to AC power;

f) an internal AC powerline that allows the generated AC power to be sent to the AC load through an external AC powerline;

g) a load interface circuit connected to said DC-AC inverter and to said internal AC powerline, said load interface circuit being arranged to filter high-frequency components out of the said DC-AC inverter's AC output;

h) a digital microcontroller connected to said DC-DC boost converters, DC-AC inverter, and load interface circuit, said microcontroller arranged to monitor the DC boost voltage, control the DC-DC boost converter, perform maximum power point tracking (MPPT), perform DC-AC inversion, monitor AC current and voltage for generated power amount and status, perform powerline communications, and perform logic controls such as AC powerline switching and isolation;

i) a powerline modem connected to said microcontroller and said internal AC powerline through an interface circuitry arranged to establish a 2-way digital signal communication between the digital microcontroller and the outside world through the external AC powerline; and j) a power supply connected to said DC power combiner and arranged to supply DC power to the electronic components of said power inverter.

15. The system of claim 14, wherein one of the said power inverters further comprises:

a) a load detector connected to said internal AC powerline and external AC powerline, and arranged to detect the impedance of the connected AC load;

b) said digital microcontroller further connected to the load detector and arranged to check the impedance of the AC load to determine if it is within predetermined specifications, initially energize the internal and external AC powerline, continually deliver AC power to the internal and external AC powerline to allow the other power inverters also connected on the same external AC powerline to synchronize the AC power being produced, continually check and determine whether the AC load is too large or too small for the power generation system to handle, and turn the power off and trigger an error signal if the load is too large or too small; and c) a line sensing circuit connected to said internal AC powerline and said microcontroller, and arranged to detect if there is AC power on the internal AC powerline prior to the startup of the inverter, and to monitor the internal AC powerline for over voltage, under voltage, over current, or under current conditions.

16. A method of making a DC to AC power conversion system incrementally scalable, comprising:
    a) providing a plurality of DC power sources and a plurality of DC to AC power inverters, said inverters each having an AC input port, an AC output port, and at least one DC input port;
    b) connecting at least one of said DC power sources, respectively, to at least one of said DC input ports; and
    c) providing AC power to an AC load.

17. The method of claim 16, further comprising:
    a) daisy-chaining at least two of said inverters, said AC power output port of each inverter being connected in a daisy chain to the AC power input port of the next inverter, except for the AC power input port of the first inverter being left open, and the AC power output port of the last inverter being connected to the AC load; and
    b) producing a total AC power that is the summation of the AC power supplied by each said inverter.

18. The method of claim 16, in which the output of each of said power inverters is single-phase AC or three-phase AC.

19. The method of claim 16, wherein each of the said power inverters comprises:
    a) at least two DC power input ports;
    b) one AC power output port arranged to supply AC power to an AC load;
    c) for each DC power input port, a DC-DC boost converter arranged to convert the voltage of a DC power source to a higher DC voltage suitable for inversion;
    d) a DC power combiner connected to said DC-DC boost converters for combining the DC output from all DC-DC boost converters and allowing the said DC-DC boost converters to connect in parallel so that all DC currents are added together;
    e) a DC-AC inverter connected to said DC power combiner and arranged to invert the DC power to AC power;
    f) an internal AC powerline that allows the generated AC power to be sent to the AC load through an external AC powerline;
    g) a load interface circuit connected to said DC-AC inverter and to said internal AC powerline, said load interface circuit being arranged to filter high-frequency components out of the said DC-AC inverter's AC output;
    h) a digital microcontroller connected to said DC-DC boost converters, DC-AC inverter, and load interface circuit, said microcontroller arranged to monitor the DC boost voltage, control the DC-DC boost converter, perform maximum power point tracking (MPPT), perform DC-AC inversion, monitor AC current and voltage for generated power amount and status, perform powerline communications, and perform logic controls such as AC powerline switching and isolation;
    i) a powerline modem connected to said microcontroller and said internal AC powerline through an interface circuitry arranged to establish a 2-way digital signal communication between the digital microcontroller and the outside world through the external AC powerline; and
    j) a power supply connected to said DC power combiner and arranged to supply DC power to the electronic components of said power inverter.

20. The method of claim 19, wherein one of the said power inverters further comprises:
    a) a load detector connected to said internal AC powerline and external AC powerline, and arranged to detect the impedance of the connected AC load;
    b) said digital microcontroller further connected to the load detector and arranged to check the impedance of the AC load to determine if it is within predetermined specifications, initially energize the internal and external AC powerline, continually deliver AC power to the internal and external AC powerline to allow the other power inverters also connected on the same external AC powerline to synchronize the AC power being produced, continually check and determine whether the AC load is too large or too small for the power generation system to handle, and turn the power off and trigger an error signal if the load is too large or too small; and
    c) a line sensing circuit connected to said internal AC powerline and said microcontroller, and arranged to detect if there is AC power on the internal AC powerline prior to the startup of the inverter, and to monitor the internal AC powerline for over voltage, under voltage, over current, or under current conditions.

21. A system for providing AC power to an AC load from a plurality of individual DC power sources each having a DC power output port, comprising:
    a) a plurality of power inverters, each of said power inverters being connected to m DC power sources, where m is an integer greater than or equal to two, and having an AC power input port and an AC power output port;
    b) said AC power output port of each inverter being connected in a daisy chain to the AC power input port of the next inverter, except for the AC power input port of the first inverter being left open, and the AC power output port of the last inverter being connected to an AC load;
    c) each of the power inverters including:
        i) m main DC-DC boost converters, each arranged to convert the voltage of a corresponding DC power source to a higher DC voltage suitable for inversion;
        ii) m backup DC-DC boost converters, each arranged to convert the voltage of said corresponding DC power source to a higher DC voltage suitable for inversion;
        iii) m DC input channel selectors, each constructed and arranged to connect its corresponding main DC-DC boost converter to said corresponding DC power source when the corresponding main DC-DC boost converter is working and connect the corresponding backup DC-DC boost converter to the DC power source when the corresponding main DC-DC boost converter is not working;
        iv) a DC power combiner connected to said main DC-DC boost converters and said backup DC-DC boost converters;
        v) a DC-AC inverter connected to said DC power combiner and arranged to invert the DC power to AC power;
        vi) an internal AC powerline that allows the generated AC power to be sent to the AC load through an external AC powerline;
        vii) a load interface circuit connected to said DC-AC inverter and to said internal AC powerline, said load interface circuit being arranged to filter high-frequency components out of the said DC-AC inverter's AC output;

viii) a digital microcontroller connected to said main DC-DC boost converters, backup DC-DC boost converters, DC input channel selectors, DC-AC inverter, and load interface circuit, said microcontroller arranged to monitor the DC boost voltage, control the DC-DC boost converters, perform maximum power point tracking (MPPT), perform DC-AC inversion, monitor AC current and voltage for generated power amount and status, perform powerline communications, perform logic controls such as AC powerline switching and isolation, perform redundancy functions;

ix) a powerline modem connected to said microcontroller and said internal AC powerline through an interface circuitry arranged to establish a 2-way digital signal communication between the digital microcontroller and the outside world through the external AC powerline; and x) a power supply connected to said DC power combiner and arranged to supply DC power to the electronic components of said power inverter;

d) one of the power inverters further including:
  i) a load detector connected to said internal AC powerline and external AC powerline, and arranged to detect the impedance of the connected AC load;
  ii) said digital microcontroller further connected to the load detector and arranged to check the impedance of the AC load to determine if it is within predetermined specifications, initially energize the internal and external AC powerline, continually deliver AC power to the internal and external AC powerline to allow the other power inverters also connected on the same external AC powerline to synchronize the AC power being produced, continually check and determine whether the AC load is too large or too small for the power generation system to handle, and turn the power off and trigger an error signal if the load is too large or too small; and
  iii) a line sensing circuit connected to said internal AC powerline and said microcontroller, and arranged to detect if there is AC power on the internal AC powerline prior to the startup of the inverter, and to monitor the internal AC powerline for over voltage, under voltage, over current, or under current conditions;

e) each of the other power inverters further including:
  i) said digital microcontroller arranged to perform AC power synchronization;
  ii) a line sensing circuit connected to said internal AC powerline and said microcontroller for detecting the phase and zero-crossing point of the incoming AC power from the external AC powerline; and
  iii) a solid state switch connected to said internal AC powerline and external AC powerline, and arranged to disconnect said internal AC powerline from the external AC powerline during the non-generation time.

22. The system of claim 21, in which the output of each of said power inverters is single-phase AC or three-phase AC.

* * * * *